(12) United States Patent
Gieseke et al.

(10) Patent No.: US 6,837,920 B2
(45) Date of Patent: Jan. 4, 2005

(54) FILTER SYSTEM; ELEMENT CONFIGURATION; AND METHODS

(75) Inventors: Steven Scott Gieseke, Richfield, MN (US); Peter J. Murray, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 10/721,934

(22) Filed: Nov. 24, 2003

(65) Prior Publication Data

US 2004/0103787 A1 Jun. 3, 2004

Related U.S. Application Data

(63) Continuation of application No. 09/729,033, filed on Dec. 4, 2000, now Pat. No. 6,652,614.

(51) Int. Cl.[7] .......................... B01D 46/02; B01D 35/30
(52) U.S. Cl. ........................... 95/273; 55/482; 55/498; 55/502; 55/503; 55/504; 55/510; 55/521
(58) Field of Search ................................ 55/385.3, 482, 55/486, 487, 490, 498, 502, 503, 510, 511, 521, DIG. 5, 504; 95/273

(56) References Cited

U.S. PATENT DOCUMENTS

| | | |
|---|---|---|
| 3,002,870 A | 10/1961 | Belgarde et al. |
| 3,160,488 A | 12/1964 | Wilber |
| 3,169,844 A | 2/1965 | Young |
| 3,290,870 A | 12/1966 | Jensen |
| 3,342,021 A | 9/1967 | Yelinek et al. |
| 3,357,163 A | 12/1967 | Burger et al. |
| 3,413,780 A | 12/1968 | Amlott et al. |
| 3,423,909 A | 1/1969 | Bennett et al. |
| 3,452,519 A | 7/1969 | Bianchetta |
| 3,488,928 A | 1/1970 | Tarala |

(List continued on next page.)

FOREIGN PATENT DOCUMENTS

| | | |
|---|---|---|
| EP | 0 329 659 B1 | 8/1989 |
| WO | WO 99/42719 | 8/1999 |

OTHER PUBLICATIONS 3 pages of drawings of Sears Craftsman filter; and photographs of the filter.

*Primary Examiner*—Duane Smith
*Assistant Examiner*—Jason M. Greene
(74) *Attorney, Agent, or Firm*—Merchant & Gould PC

(57) ABSTRACT

A filter element is includes a cylindrical media pack defining a central open volume and a longitudinal axis; a first end cap having a central aperture in flow communication with the central open volume; and a second, closed end cap having a central region closing an end of the media pack central, open volume. The closed end cap includes a projection extending axially outwardly therefrom and positioned at a location intersected by the longitudinal axis. An end cover for an air cleaner includes an inner side including a central projection thereon. Preferably, the central projection comprises a wall that includes an outer perimeter defining a regular polyhedron having at least five sides. An air cleaner comprises a cylindrical filter element having a first open end cap, a second closed end cap, and a cylindrical media pack extending therebetween. The first end cap defines an internal radial seal region. The second, closed end cap has a central region including a circular recessed portion. The air cleaner also includes an end cover. The end cover includes an inner side including a central projection thereon. The central projection is sized and shaped to matably engage the recessed portion of the second closed end cap, when the filter element is operably installed in the end cover. Methods for installing a filter element in an air cleaner preferably will use constructions as described herein.

23 Claims, 17 Drawing Sheets

U.S. PATENT DOCUMENTS

| | | | |
|---|---|---|---|
| 3,710,560 A | | 1/1973 | Maddocks |
| 3,716,436 A | | 2/1973 | Pall et al. |
| 4,006,000 A | | 2/1977 | Tortorici et al. |
| 4,062,781 A | | 12/1977 | Strauss et al. |
| 4,222,755 A | | 9/1980 | Grotto |
| 4,303,426 A | | 12/1981 | Battis |
| 4,349,363 A | * | 9/1982 | Patel et al. .............. 55/510 |
| 4,498,915 A | | 2/1985 | Witchell |
| 4,588,426 A | | 5/1986 | Virgille et al. |
| 4,728,423 A | | 3/1988 | Kuwajima |
| 4,838,901 A | | 6/1989 | Schmidt et al. |
| 4,950,317 A | | 8/1990 | Dottermans |
| 5,071,456 A | * | 12/1991 | Binder et al. ............ 55/510 |
| 5,112,417 A | | 5/1992 | Sayles |
| 5,116,499 A | | 5/1992 | Deibel |
| 5,118,417 A | | 6/1992 | Deibel |
| 5,137,557 A | | 8/1992 | Behrendt et al. |
| 5,211,846 A | | 5/1993 | Kott et al. |
| 5,250,179 A | | 10/1993 | Spearman |
| 5,277,157 A | | 1/1994 | Teich |
| 5,290,445 A | | 3/1994 | Buttery |
| 5,484,466 A | * | 1/1996 | Brown et al. ............ 55/502 |
| 5,547,480 A | | 8/1996 | Coulonvaux |
| 5,601,717 A | | 2/1997 | Villette et al. |
| 5,605,555 A | | 2/1997 | Patel et al. |
| 5,605,625 A | | 2/1997 | Mills |
| 5,632,791 A | | 5/1997 | Oussoren et al. |
| 5,685,985 A | | 11/1997 | Brown et al. |
| 5,720,788 A | | 2/1998 | Puckett et al. |
| 5,720,790 A | | 2/1998 | Kometani et al. |
| 5,730,769 A | | 3/1998 | Dungs et al. |
| 5,736,040 A | | 4/1998 | Duerrstein et al. |
| 5,741,421 A | | 4/1998 | Erdmannsdoerfer et al. |
| 5,753,117 A | | 5/1998 | Jiang |
| 5,755,842 A | | 5/1998 | Patel et al. |
| 5,755,844 A | | 5/1998 | Arai et al. |
| 5,800,581 A | | 9/1998 | Gielink et al. |
| 5,865,863 A | | 2/1999 | DeSousa et al. |
| 5,893,937 A | | 4/1999 | Moessinger |
| 5,897,676 A | | 4/1999 | Engel et al. |
| 5,951,729 A | | 9/1999 | Ernst et al. |
| 5,984,109 A | | 11/1999 | Kanwar et al. |
| 6,051,042 A | | 4/2000 | Coulonvaux |
| 6,099,606 A | | 8/2000 | Miller et al. |

\* cited by examiner

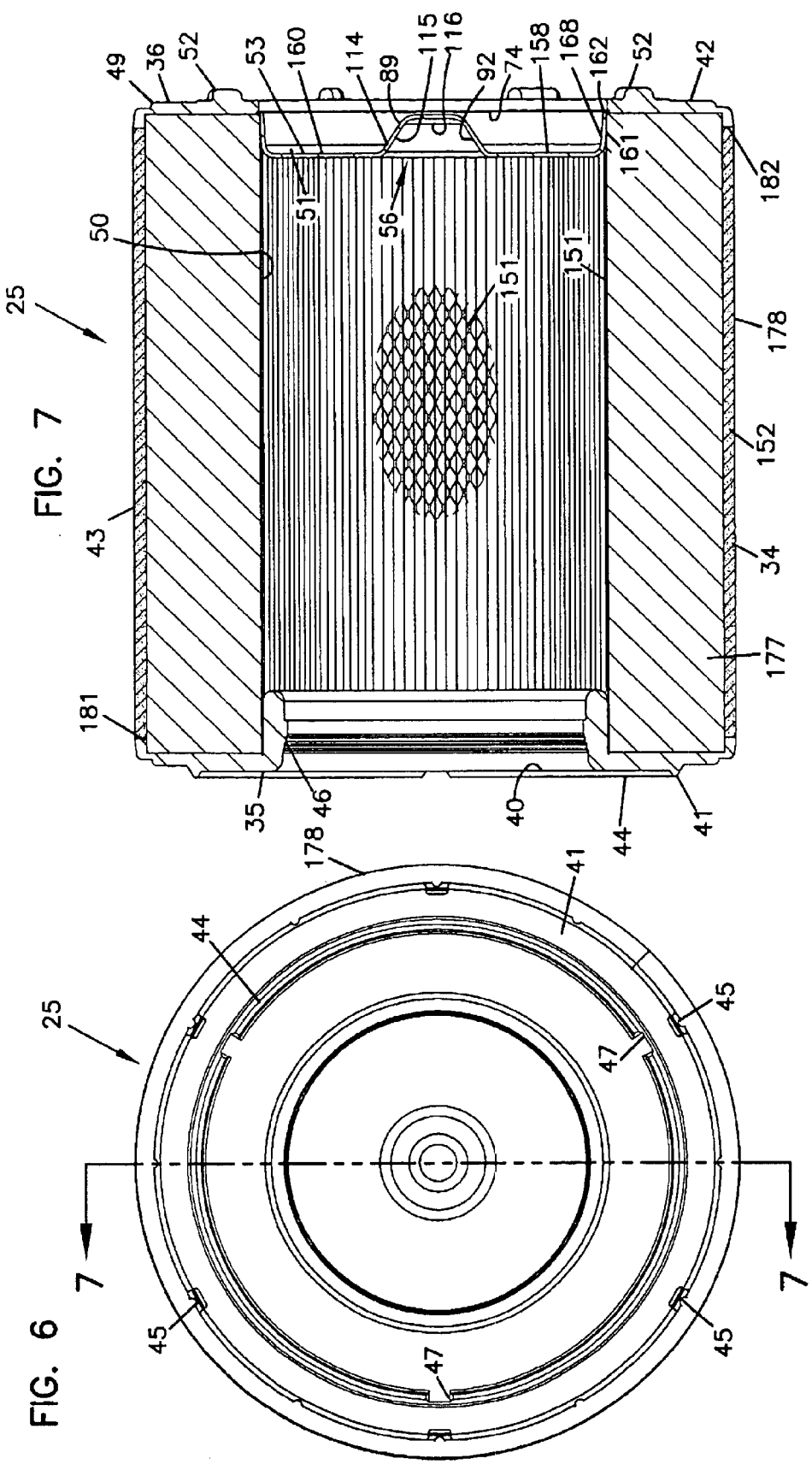

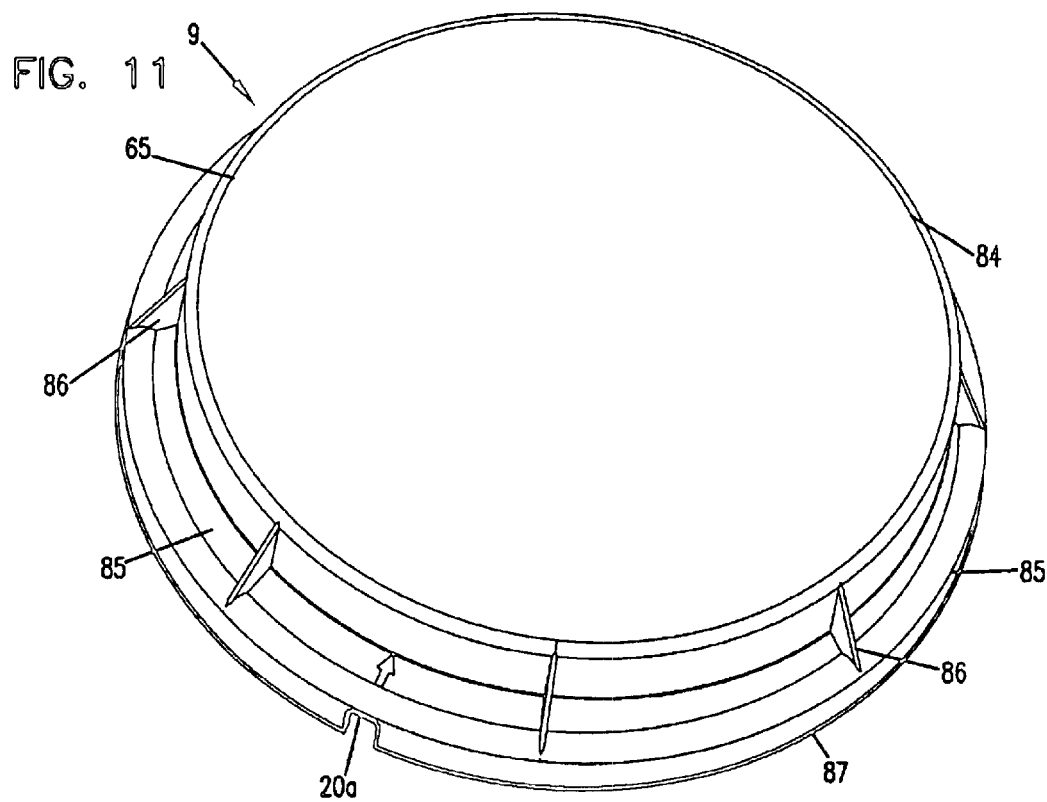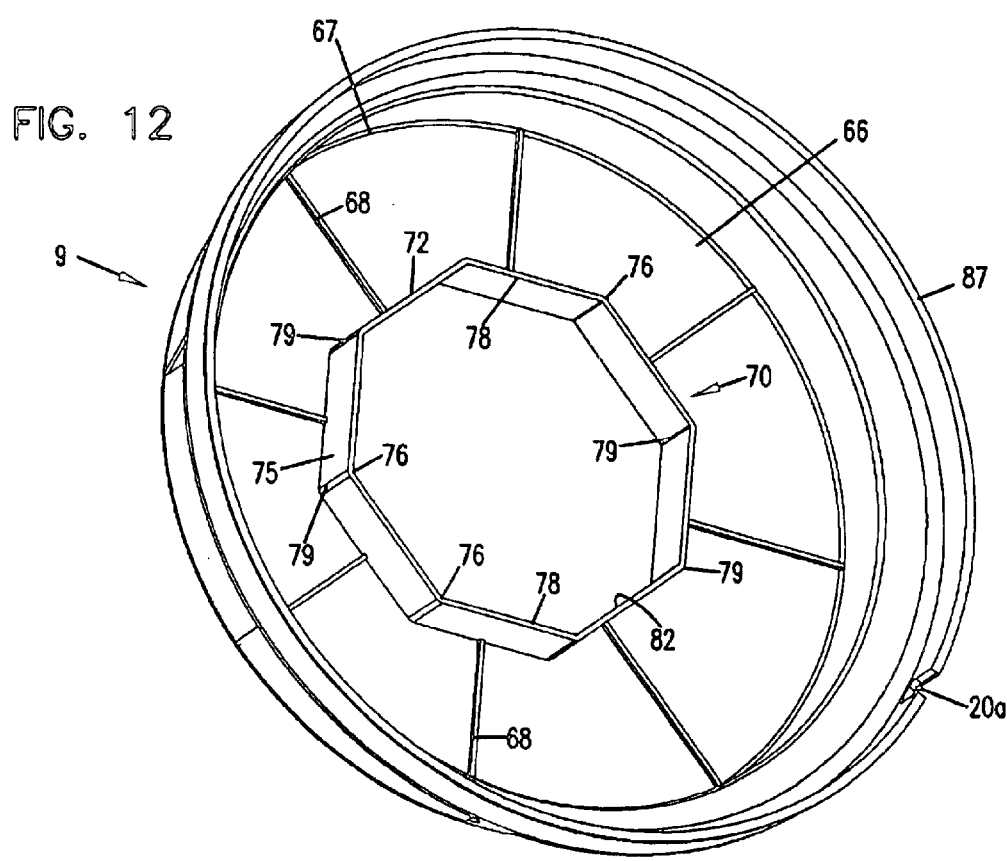

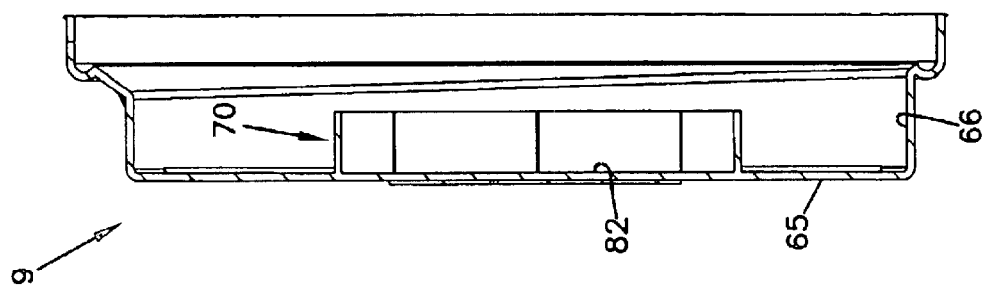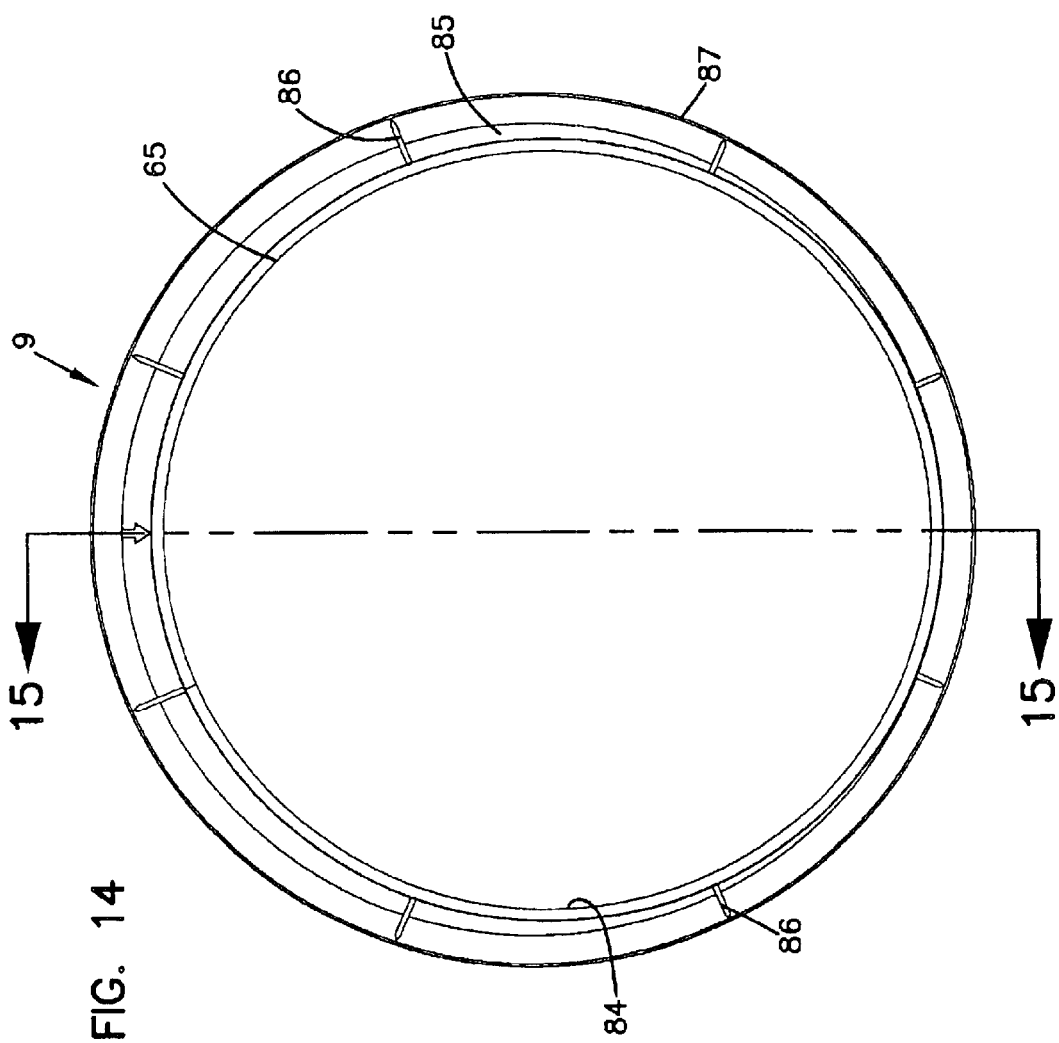

US 6,837,920 B2

FILTER SYSTEM; ELEMENT CONFIGURATION; AND METHODS

This application is a continuation of application Ser. No. 09/729,033 filed Dec. 4, 2000, and issued as U.S. Pat. No. 6,652,614. Application Ser. No. 09/729,033 is incorporated herein by reference.

TECHNICAL FIELD

The present invention relates to air cleaner systems. It particularly concerns air cleaners for air intake systems of combustion engines and/or air compressor systems. In a typical application, the air cleaner will be used in association with the air intake system for equipment such as off road machinery (track-type tractors; truck loaders; skid steer loaders; pipelayers; excavators; material handlers; wheeled excavators; front shovels; forest machines; track skidders; drum compactors (soil or asphalt); pneumatic compactors; asphalt pavers; soil stabilizers; cold planers; VFS trailers; wheel loaders; telescopic handlers; integrated tool carriers; wheel tractors; landfill compactors; soil compactors; backhoe loaders; articulated trucks; off highway trucks and tractors; scrapers; motor graders; wheel skidders; and generator sets), farm equipment (tractors, combines), on mining equipment (ore haulers). The invention also concerns air filter elements, for such systems, and methods of assembly and use.

BACKGROUND

In general, the machinery vehicles or other equipment that operate with internal combustion engines require filtration systems for the air intake to the engine. Such air filtration arrangements, typically referenced by the term "air cleaner", are generally positioned to separate dust and other components from the air as it is drawn into the engine. Air cleaners typically include a housing and a replacement filter element arrangement. Typically, the air cleaners are designed such that the filter elements can be removed and replaced.

Air compressor systems typically include two air lines that need filtration: the intake air to the engine; and, the intake air to the compressed air storage. Air cleaners are desirable for these systems as well.

In general, improvement in air cleaners for such systems have been desired.

SUMMARY OF THE DISCLOSURE

A filter element is disclosed that includes a cylindrical media pack defining a central open volume and a longitudinal axis; a first end cap having a central aperture in flow communication with the central open volume; and a second, closed end cap having a central region closing an end of the media pack central, open volume. In preferred constructions, the closed end cap includes a projection extending axially outwardly therefrom and positioned at a location intersected by the longitudinal axis.

An end cover for an air cleaner is also provided. The end cover may include an inner side including a central projection thereon. Preferably, the central projection comprises a wall that includes an outer perimeter defining a regular polyhedron having at least five sides.

An air cleaner is provided that comprises a cylindrical filter element having a first open end cap, a second closed end cap, and a cylindrical media pack extending therebetween. The first end cap defines an internal radial seal region. The second, closed end cap has a central region including a circular recessed portion. The air cleaner also includes an end cover. The end cover includes an inner side including a central projection thereon. The central projection is sized and shaped to matably engage the recessed portion of the second closed end cap, when the filter element is operably installed in the end cover.

Methods for installing a filter element in an air cleaner preferably will use constructions as described herein. Methods for changing the filter element will also preferably use constructions as described herein. Methods for cleaning air are provided.

BRIEF DESCRIPTION OF THE DRAWINGS

FIG. 6 is an end elevational view of the primary filter element depicted in FIG. 4, and showing the opposite end as that shown in FIG. 5.

FIG. 7 is a cross-sectional view of the primary filter element depicted in FIGS. 4–6, the cross-section taken along the line 7—7 of FIG. 6.

FIG. 11 is a perspective view of the outer portion of the end cover of the air cleaner.

FIG. 12 is a perspective view of the inside of the end cover for the air cleaner.

FIG. 14 is a bottom plan view of the end cover shown in FIGS. 12 and 13.

FIG. 15 is a cross-sectional view of the end cover depicted in FIGS. 11–14, the cross-section being taken along the line 15—15 in FIG. 14.

DETAILED DESCRIPTION

I. Air Filtration Systems—Generally

In general, air filtration systems for such equipment as off-road equipment, farm equipment, mining equipment and over the highway trucks, include at least one removable and replaceable filter element, mounted inside an installed air cleaner housing. In many systems, two filter elements are used, both of which are removable and replaceable, with a first filter element positioned as an upstream or primary element, and a second filter element positioned as a downstream, secondary or safety element.

Figure 1:
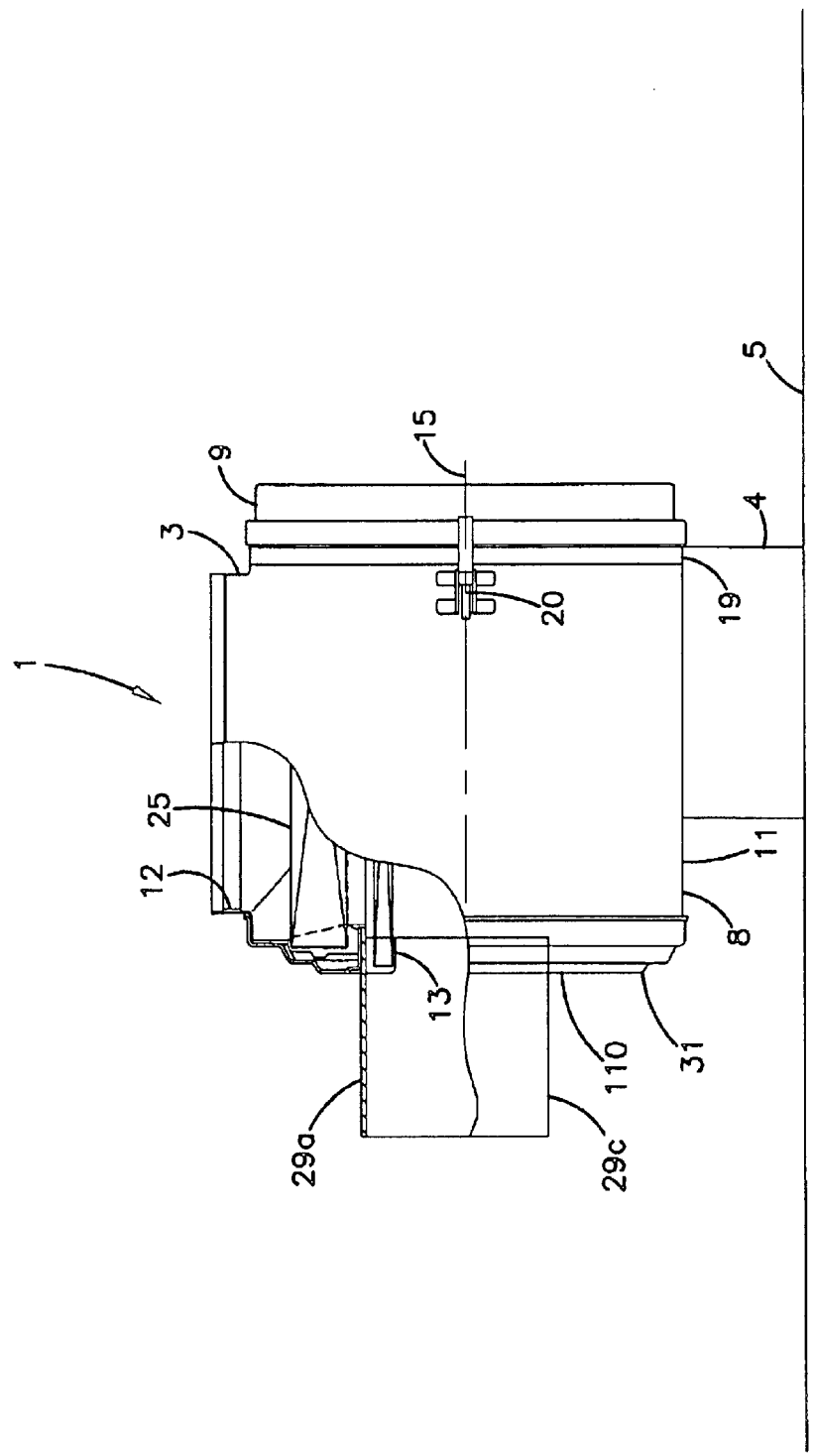
FIG. 1 is a side elevational, partially fragmented, schematic view of an air cleaner mounted on an air flow tube on an air intake system.

Attention is directed to FIG. 1, wherein certain external features of a typical air cleaner system or assembly are depicted. Referring to FIG. 1, the reference number 1 depicts the air cleaner. The air cleaner 1 comprises a housing 3 mounted, for example, by a mounting bracket 4 to a frame member 5 of appropriate equipment. The equipment would typically comprise a vehicle such as a truck, off-road construction equipment, tractor or similar vehicle; or, a stationary generator set or air compressor.

The housing 3 of a typical air cleaner 1 is generally defined by two primary sections or segments: i.e. main body 8, and removable service or access cover 9. The access cover 9 provides for service access to an interior of the main body 8, for servicing. For an air cleaner 1 of the general type depicted in FIG. 1, servicing generally involves dismounting and removing from the housing 3 at least one internally received filter element, either for refurbishing or replacement.

The housing 3 of the air cleaner 1 depicted includes outer wall 11, air inlet 12 and outlet 13. For the preferred embodiment shown, the inlet 12 and outlet 13 are both in the main body 8. In typical use, ambient or unfiltered air enters the air cleaner 1 through inlet 12. Within the air cleaner 1, the air is passed through a filter arrangement, described below, to obtain a desirable level of particulate removal. The filtered air then passes outwardly from the air cleaner 1 through outlet 13, and is directed, by appropriate ductwork or conduits, to an inlet of an air intake for an associated engine or compressor or other system.

The particular air cleaner 1 depicted has outer wall 11 defining a barrel shaped or generally cylindrical configuration. In this particular configuration, the outlet 13 can be described as an axial outlet, since it generally extends in the direction of, and circumscribes, axis 15; axis 15 being a longitudinal central axis defined by an internally received primary element 25, as described below.

Figure 2:
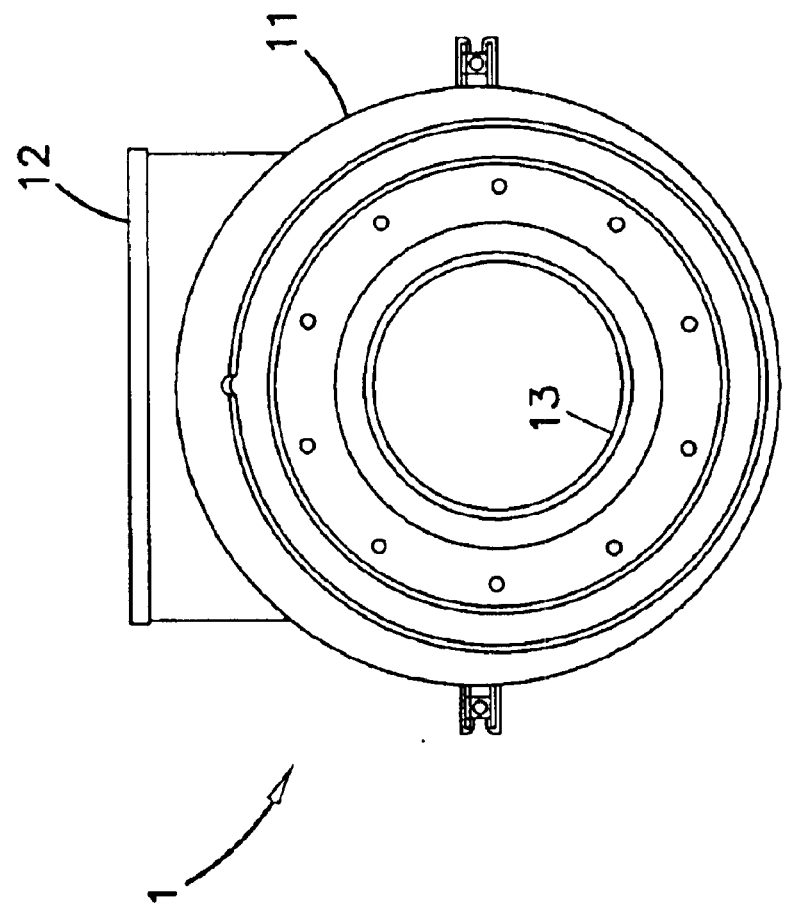
FIG. 2 is an end view of the air cleaner of FIG. 1, but without the air flow tube and mounting bracket.

It is noted that the particular air cleaner 1 depicted in FIG. 1, as seen from the end view of FIG. 2, is somewhat "obround", i.e. slightly off round from cylindrical. Such configurations are well known, as are housings that are more perfectly cylindrical. Herein, both types will be referred to as "generally cylindrical."

Access cover 9 generally fits over an open end 19 of body 8. In the particular arrangement shown, access cover 9 is secured in place over end 19 by latches 20.

Because the particular arrangement 1 depicted is slightly obround, it is desirable to ensure proper alignment between the end cover 9, and a remainder of the housing body 8. Proper radial alignment can be obtained by engagement between a notch 20a (FIGS. 11–13) on the cover 9, and a post on the housing body 8.

The particular air cleaner 1 depicted is shown mounted in a generally horizontal configuration, i.e. with axis 15 extending generally horizontally (assuming the equipment is standing on level ground and with frame section 5 extending generally parallel to the ground). However, it is recognized that air cleaners 1 of the type depicted can be used in other orientations.

Figure 3:
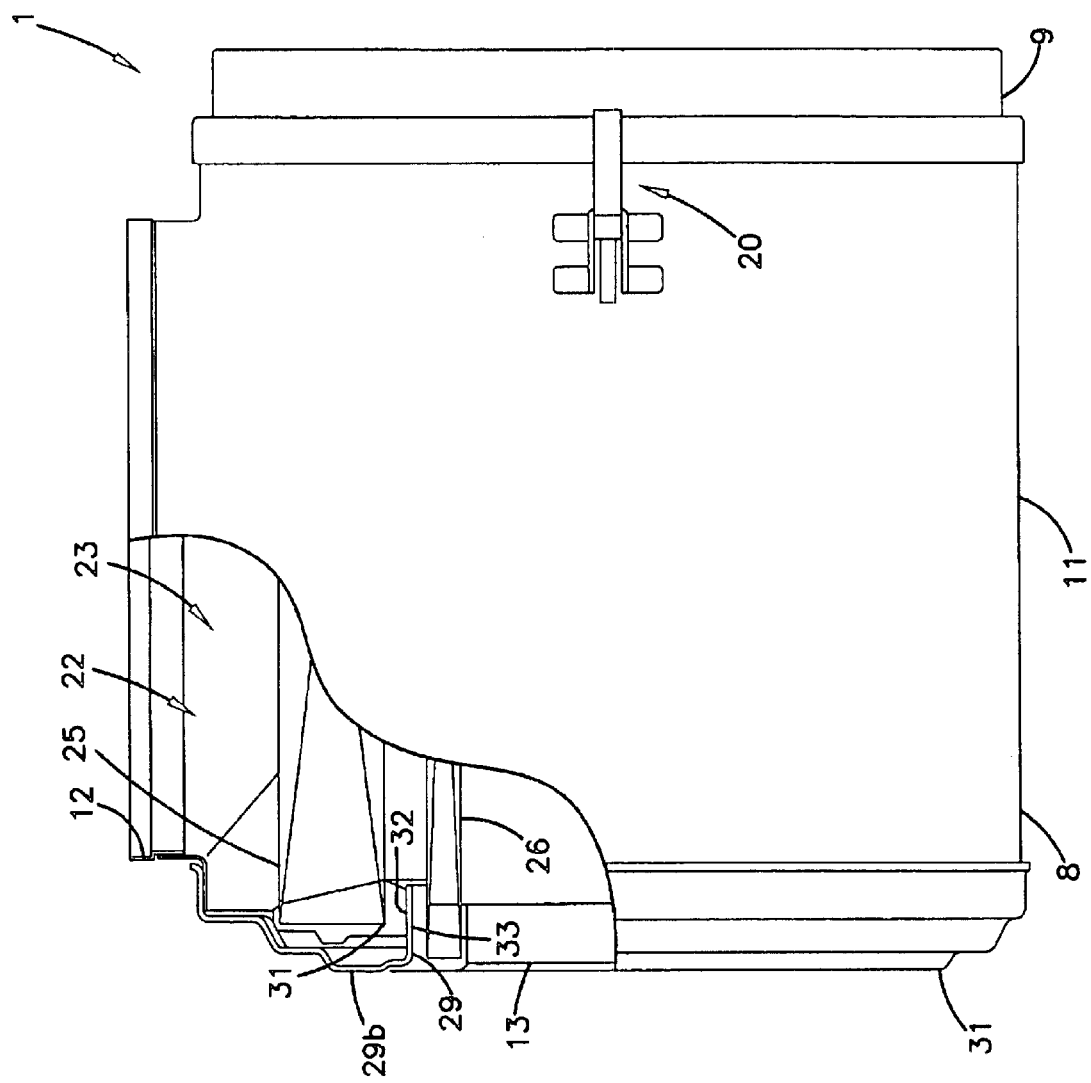
FIG. 3 is a side elevational, fragmented, enlarged view of the air cleaner depicted in FIG. 1.
Figure 4:
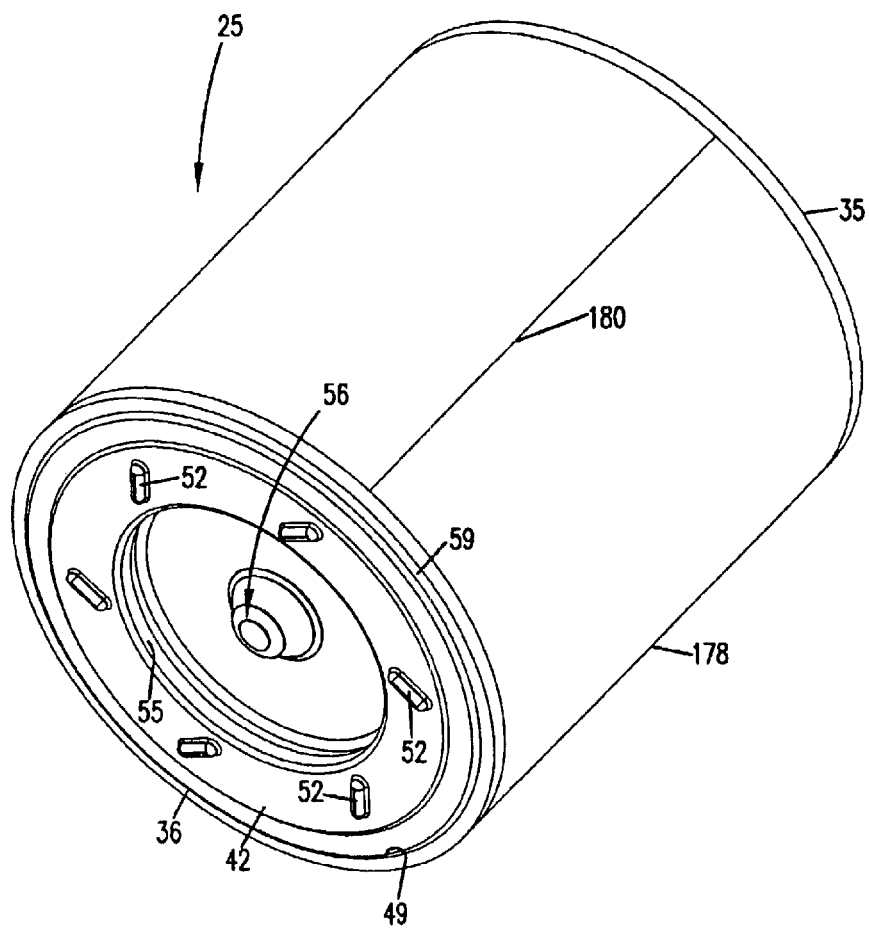
FIG. 4 is a perspective view of a primary filter element usable in the air cleaner depicted in FIGS. 1–3.
Figure 5:
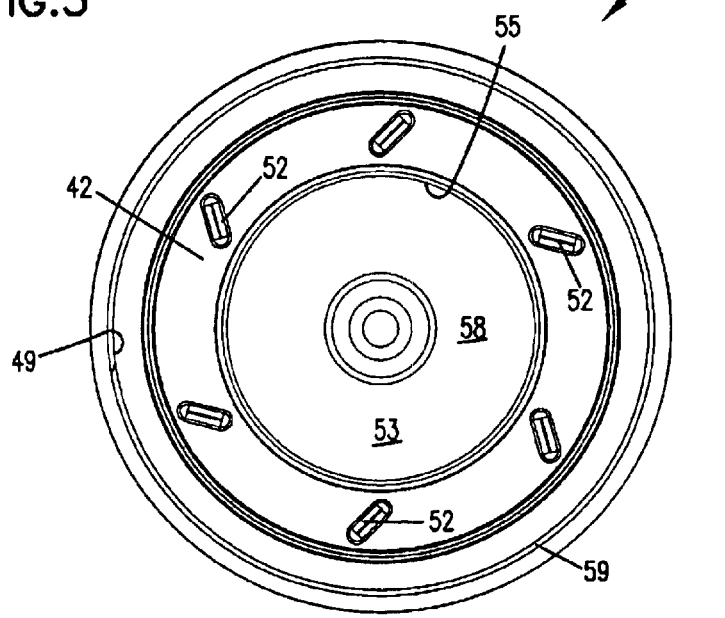
FIG. 5 is an end elevational view of the filter element depicted in FIG. 4.

Attention is directed to FIG. 3, in which portions of the assembly 1 are depicted broken away, for viewing of selected internal detail. Referring to FIG. 3, it can be seen that the body 8, along with side portions 20 of the cover 9, defines interior 22 of the air cleaner assembly 1. Within the interior 22 for the particular air cleaner 1 depicted is positioned an air filter arrangement 23, through which air is directed during use. The particular air filter arrangement 23 shown includes a first or primary filter element 25 and a secondary or safety filter element 26.

For the particular arrangement shown, the filter elements 25 and 26 are cylindrical in configuration, and thus have an outer circular periphery. The housing body, being slightly obround, then, does not define a perfect central longitudinal access in alignment with the filter elements 25, 26. Such arrangements, again, are common. However, it is also common to have both the housing and the filter element have circular outer perimeters, and the same central longitudinal axis.

Herein, the terms "filter element" or "element" are used to refer to a removable, replaceable component (with respect to housing 11) that includes filter media through which the air being filtered passes, as the air is directed: (1) from the inlet 12; (2) through interior 22; (3) to the outlet 13; in general with the element performing an air filtration (or dust removal) function. Unless otherwise stated, the terms "element", "filter" and "filter element" are meant to refer to a removable and replaceable component within the air cleaner assembly 1. Generally and preferably, filter elements are configured such that they can be removed and replaced by hand, at appropriate service intervals. This will be described in greater detail below.

Herein, the terms "primary element" and "main element" are generally used to refer to a filter element on which a majority of dust loading occurs during air cleaner use. In typical systems that have two elements, the primary element is positioned upstream from the secondary or safety element, during typical assembly. By "upstream" in this context, it is meant that, due to filter element position, air cleaner configuration, and the location of seals during use, air generally must pass through the primary element before the air passes through the safety or secondary element, when the air moves from the inlet 12 to the outlet 13.

Herein, the terms "secondary element" or "safety element" are used interchangeably, and refer to a downstream element from the primary element. Typically, very little dust loading occurs on the secondary or safety element, and generally only as a result of either: failure of some portion of the primary element or a seal; inadvertent dust movement during servicing of the primary element; or some mishap.

Referring to FIG. 3, for the air cleaner 1 depicted, both the primary element 25 and the safety element 26 are generally cylindrical in configuration, each having an open cylindrical interior and a circular outer periphery (in cross-section). The two elements 25, 26 are configured such that the primary element 25 is mounted in a manner circumscribing the safety element 26. This general configuration of a cylindrical primary element 25 being mounted over a cylindrical secondary element 26 has been used in a variety of equipment, and is described, for example, in the following patents: U.S. Pat. Nos. 6,051,042; 6,099,606; each of which is incorporated herein by reference.

Referring to FIG. 3, the assembly 1 includes an interior mounting ring or sealing ring 29. The seal ring 29 is a portion of an outlet flow construction or tube 29a (FIG. 1), in flow communication with outlet 13. More specifically, ring 29, wall section 29b and outlet projection 29c collectively form outlet tube 29a for exit of filtered air from the air cleaner 1.

In general, for the arrangement 1 shown, the safety element 26 is mounted to seal against an interior surface 30 of the mounting ring 29 (or tube 29a), and the primary element 25 is mounted to seal against an exterior surface 31 of the mounting ring 29 (or tube 29a).

The seal 32 formed between the primary element 25 and the outer surface 31 of the seal ring 29, will generally be referred to herein as "radial" because the sealing forces are directed radially toward and/or away from, i.e. generally orthogonal to, axis 15. That is, the seal forces are radially directed as opposed to being axially directed; "axial" in this context meaning pointed in a direction generally parallel to axis 15. The particular radial seal for element 25, is sometimes termed "interior" or "internal" because the radial seal 32 is located at an interior of element 25.

A variety of types of radial seal systems are known. One of the most widely utilized radial seal systems for air cleaner assemblies of the types depicted in FIGS. 1 and 2, is the Donaldson Radialseal™ system, available from the Donaldson Company, Inc., of Bloomington, Minn., and described generally in such references as EP 0329659; and U.S. Pat. No. 5,547,480; each of these publications being incorporated herein by reference. The Donaldson Radialseal™ systems have been utilized on primary elements for such equipment as off road machinery and vehicles, farm tractors, ore haulers, over-the-highway trucks; and, air compressors.

The safety element 26 is also sealed to the seal ring 29 by a radial seal 33. In this instance, the radial seal 33 is an "exterior" radial seal, since it extends outwardly away from, and around, an outside of element 26, as opposed to being directed inside. Such seals are described for example in U.S. Pat. No. 6,099,606, which is incorporated herein by reference. Donaldson-manufactured safety elements using such radial seals have been provided for such equipment as off road machinery and equipment such as tracked vehicles; wheeled equipment; roller compactors; generator sets; and, ore haulers.

II. TWO POTENTIAL ISSUES WITH SYSTEMS SIMILAR TO THOSE DEPICTED IN FIGS. 1 AND 2

A. Support for Horizontally Mounted Primary Elements

When the air cleaner system is generally as illustrated in FIGS. 1 and 2, with the axis 15 extending generally horizontally, the filter element 25 is also mounted generally horizontally. At the end 31 associated with the outlet tube 13, the element 25 is generally well supported by the mounting ring 29. However, at the opposite end, not shown in FIG. 2, there is generally no analogous structure to which the element is sealed, to support the element in a horizontal configuration. Thus, typically, a support structure is desirable.

In certain prior radial seal systems, it was known to use an outer cylindrical sleeve or shroud at this location, which supports the primary element exteriorly, in position. Such shrouds are shown for example, in U.S. Pat. No. 6,051,042 and U.S. Pat. No. 5,755,842, each of which is incorporated herein by reference.

With respect to the issue of horizontal support, radial seal systems differ significantly from axial seal systems. With axial seal systems, generally either a bolt arrangement or clamp arrangement is used to apply axial pressure to the element in some manner forcing the element against an end of the housing. Such systems are shown, for example, in U.S. Pat. No. 3,488,928, which is incorporated herein by reference. In general, horizontal support for such systems is not required during assembly, since the axial pressure keeps the element from moving. In some instances, support arrangements are provided to facilitate appropriate positioning or centering of the element during assembly.

B. Alignment of the Safety Element

In general, servicing of arrangements such as those illustrated in FIGS. 1 and 2 can be a problem, if the safety element 26 is not installed in near perfect axial alignment, since the primary element 25 must be installed over the safety element 26. This problem is exacerbated in longer safety elements 26, i.e. elements at least 10 inches (25 cm) or longer.

To help align the safety element, some safety element alignment systems have been developed, see for example U.S. Pat. No. 5,800,581 and U.S. Pat. No. 3,488,928, each of the references being incorporated herein by reference.

III. THE PRIMARY ELEMENT

Attention is now directed to FIGS. 4–7, in which the primary element 25 is depicted. The primary element 25 includes a side extension 34, open end 35, and closed end 36. In general, the side extension 34 extends between the open and closed ends 35, 36. The open end 35 generally defines a central aperture 40, FIG. 7.

For the embodiment depicted, the primary element 25 includes a first end cap 41 and a second end cap 42, with filter media pack 43 extending therebetween. In general, the first end cap 41 defines a first, or open end 35; the second end cap 42 defines a second, or closed end 36; and, the media pack 43 defines the side extension 34. In typical systems, the media pack 43 will be generally cylindrical with central axis 15. A variety of constructions can be used for the media pack 43, a preferred one for certain applications being described hereinbelow.

For the arrangement 1 depicted, the first end cap 41 serves several functions. For example, it defines central outlet aperture 40 and a central sealing region 46 for sealing against surface 29 (FIG. 3), when the element 25 is installed. Also, the end cap 41 secures components of the media pack 43 together and inhibits air and dust leakage around them.

In addition, structural features provided in the end cap 41 can provide performance enhancements. More specifically, end cap 41 includes a segmented, raised ring structure 44, FIG. 6. When the end cap 41 is manufactured from a preferred soft compressible polyurethane, for example, of the type indicated below, the segmented ring 44 forms a bumper type extension at end 35 of element 25. This can provide a non-sealing, cushioning, against wall 11 of housing 3 (FIG. 1).

In typical preferred systems, the first end cap 41 is a single, unitary, molded material, preferably a soft compressible material; most preferably, a compressible, foamed, polyurethane. Preferred materials and characteristics are provided herein below. Preferably the structural features of the end cap 41, then, are provided during a molding process at the same time that the media pack 43 is potted in, or secured to, the material of end cap 41. A general approach to this construction is also described below.

For certain arrangements, the seal region 46 will be shaped or configured analogously to other Donaldson Radialseal™ systems. Such configurations are described and shown for example in EP 0329659; U.S. Pat. No. 5,547,480; U.S. Pat. No. 6,099,606; and especially WO9942719A2. The complete disclosures of each of these references are incorporated herein by reference.

Figure 8:
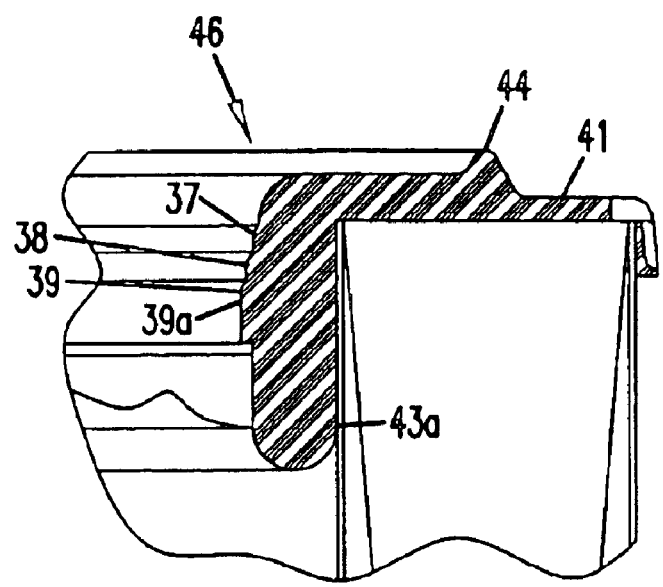
FIG. 8 is an enlarged, cross-sectional view of the seal member of the end cap for the primary filter element, depicted in FIGS. 4–7.

Attention is directed to FIG. 8, which shows a fragmented, blow-up cross-section of a three step or three stage radial seal configuration usable in the element 25.

More specifically, radial seal region 46 includes: (moving from outside of the element inwardly), three ring or steps 37, 38 and 39, of sequentially decreasing diameter. As a result, positioning of the element 25 over the outlet tube 29, is facilitated since the compression occurs in consecutive steps of increasing resistance.

The radial seal region 46 is preferably constructed and arranged to compress at least 12% of its thickness, i.e. the distance between the outer surface 39a when uncompressed, and the inner surface 43a of the media pack, the inner surface 43a typically being defined by an inner liner. Preferably, the compression is by an amount of at least 15% of its thickness, typically 20 to 33% of its thickness.

Again, because of the soft compressible nature of the material of end cap 41, (especially the material in region 46), when the primary element 25 is installed on the seal ring 29, the material in region 46 is compressed against the exterior surface 31; generally with the compression being controlled and contained by a portion of the media pack 43, typically an inner liner as characterized below.

The second end cap 42, defines the closed end 36 of the primary element 25. The second end cap 42 also serves a number of functions. For example, end cap 42 operates to retain the media pack 43 together and sealed at closed end 36. This operation is generally conducted by outer annular region 49 of the second end cap 42. In addition, portions of the second end cap 42 operate to provide extension across otherwise open interior 50 of primary element 25, to close end 51 to passage of unfiltered air therethrough. This function is performed by central area 53 of the second end cap 42. By "closed end", it is meant the end cap 42 prevents passage into or out of the filter interior 50; a closed end includes an end cap with a hole plugged by something carried by the filter element, for example.

As will be indicated below, the annular region 49 may comprise either a soft compressible material or a hard material. Preferably, the annular region 49 includes a plurality of segments 52 projected axially outwardly therefrom, to form a non-sealing, engagement with cover 9, during installation, FIG. 10.

The preferred second end cap 42 depicted includes features providing for additional functions. One function relates to appropriate configuration for support of the primary element 25, when mounted in a horizontal position as indicated in FIGS. 1 and 2. This function is performed in part by central rim 55 as described below. Also preferably, portions of second end cap 42 provide for an alignment and support function in cooperation with the safety element 26. For the particular arrangement shown, this function is provided by safety element engagement portion 56, as described below.

For the particular arrangement depicted, the second end cap 42 is a two component end cap, with the first component comprising molded polymeric material which defines annular region 49 and a second component comprising a preformed structure 58 which defines central rim 55, central region or area 53, and safety element engagement portion 56. By "preformed" in this context, it is meant that the structure 58 preferably comprises a rigid material preformed to possess a preferred configuration and that is then secured into the overall primary element 25, during a step of element construction, described below, prior to molding outer annular region 49. Preformed structure 58 is described in greater detail below.

IV. SUPPORT OF THE PRIMARY ELEMENT SECOND OR CLOSED END, DURING AIR CLEANER USE

As indicated above, features of the primary element 25 facilitate support of the element-closed end 36 when installed for use, especially in the horizontal position depicted in FIGS. 1 and 2. With respect to this function, attention is directed to FIGS. 9–15.

Referring first to FIGS. 11–15, end cover 9 is depicted. The end cover 9 includes an outer surface 65 and an inner surface 66. When installed, the outer surface 65 of the cover 9 is the surface generally directed toward the exterior environment, and the inner surface 66 is generally directed toward the air cleaner interior 22.

Figure 13:
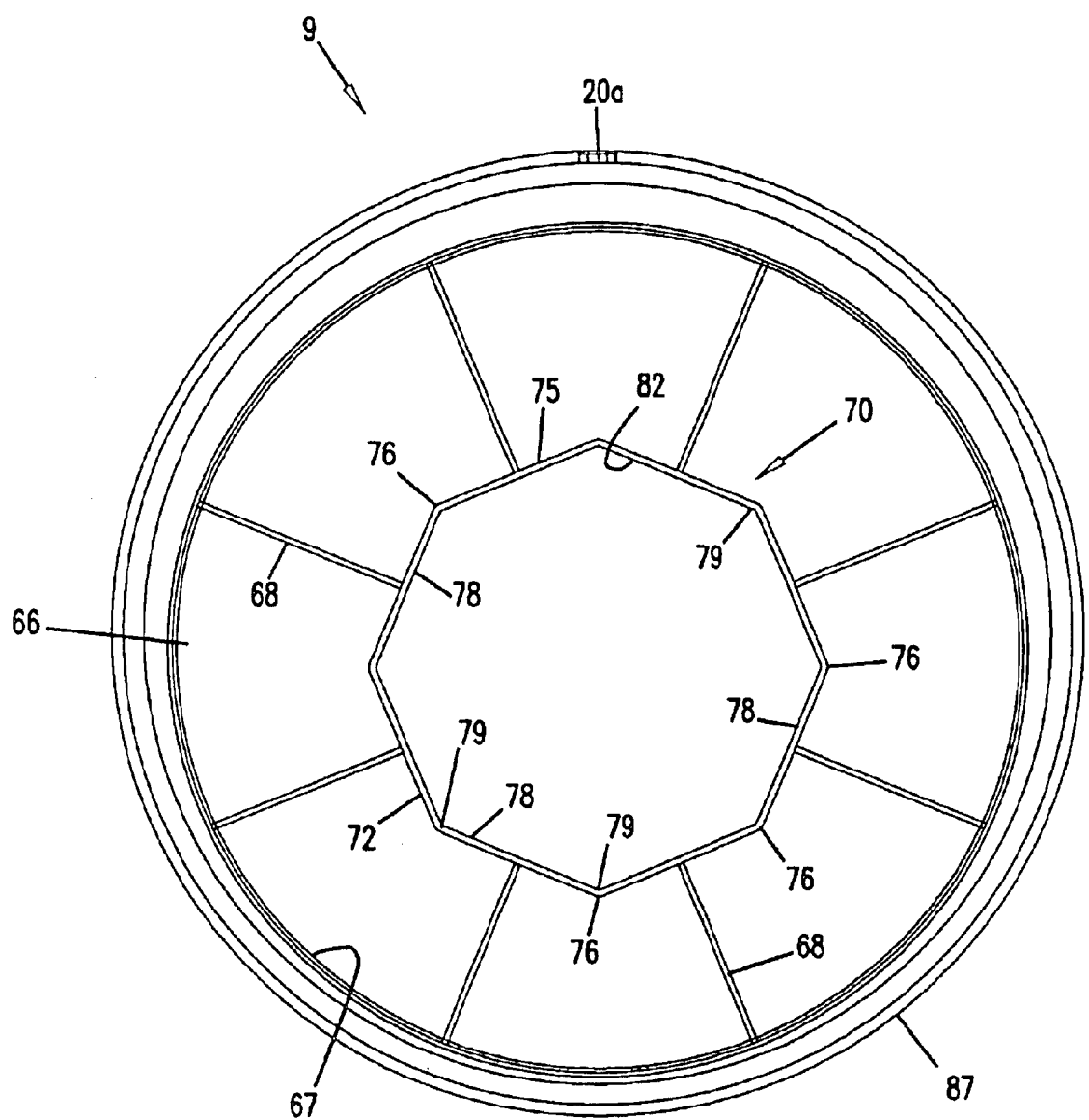
FIG. 13 is a top plan view of the end cover depicted in FIG. 12.
Figure 16:
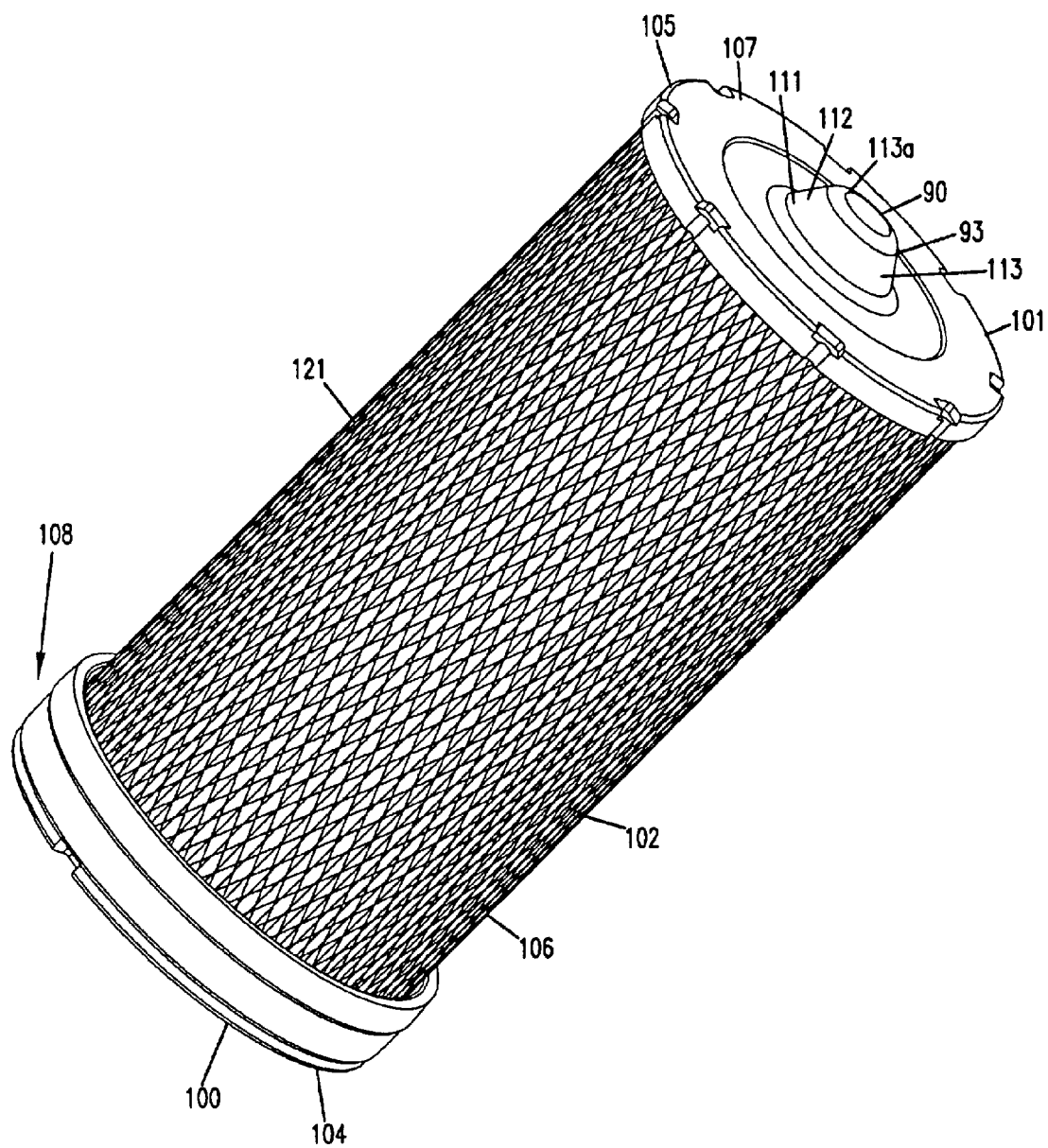
FIG. 16 is a perspective of the safety element.
Figure 17:
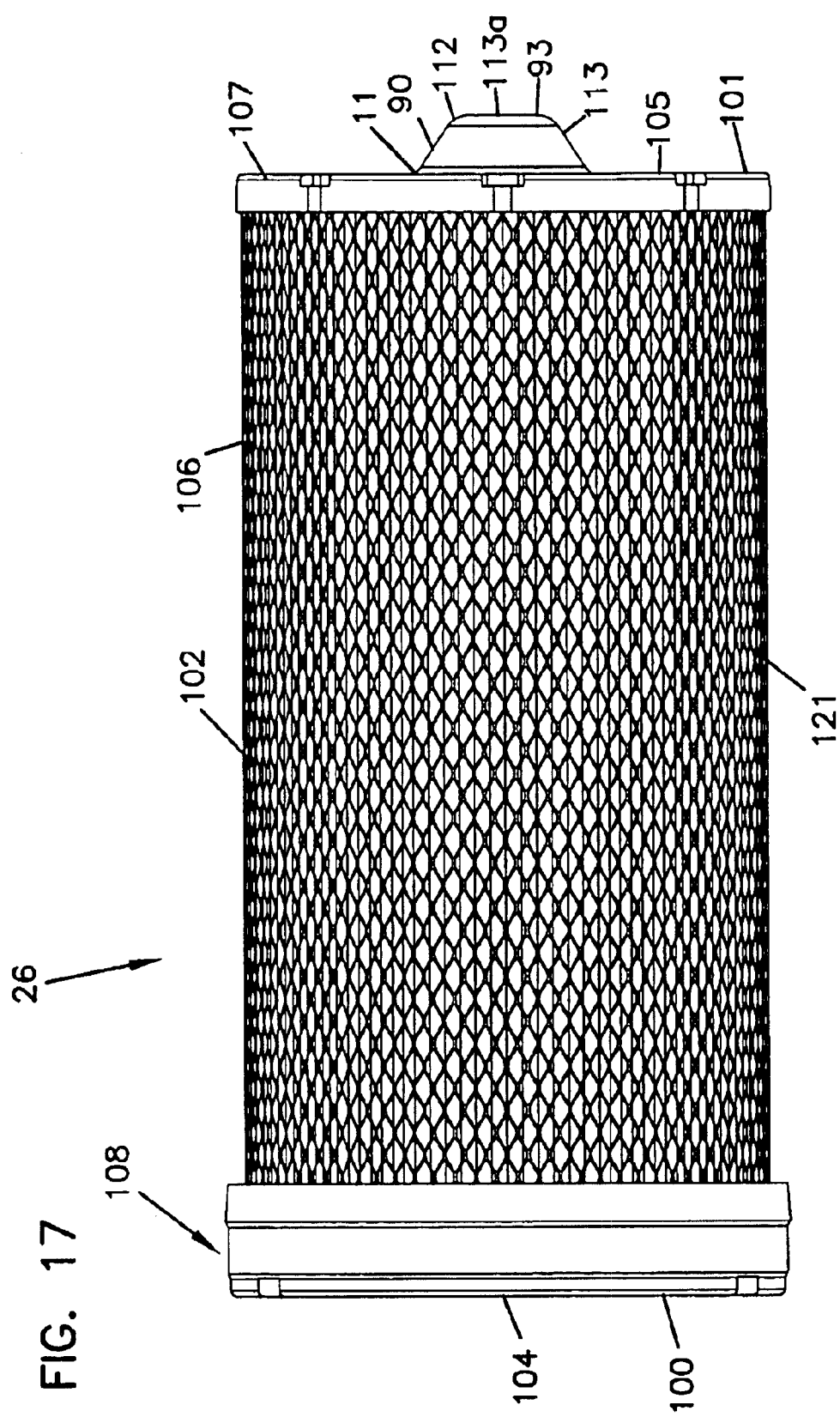
FIG. 17 is a side elevational view of the safety element depicted in FIG. 16.
Figure 18:
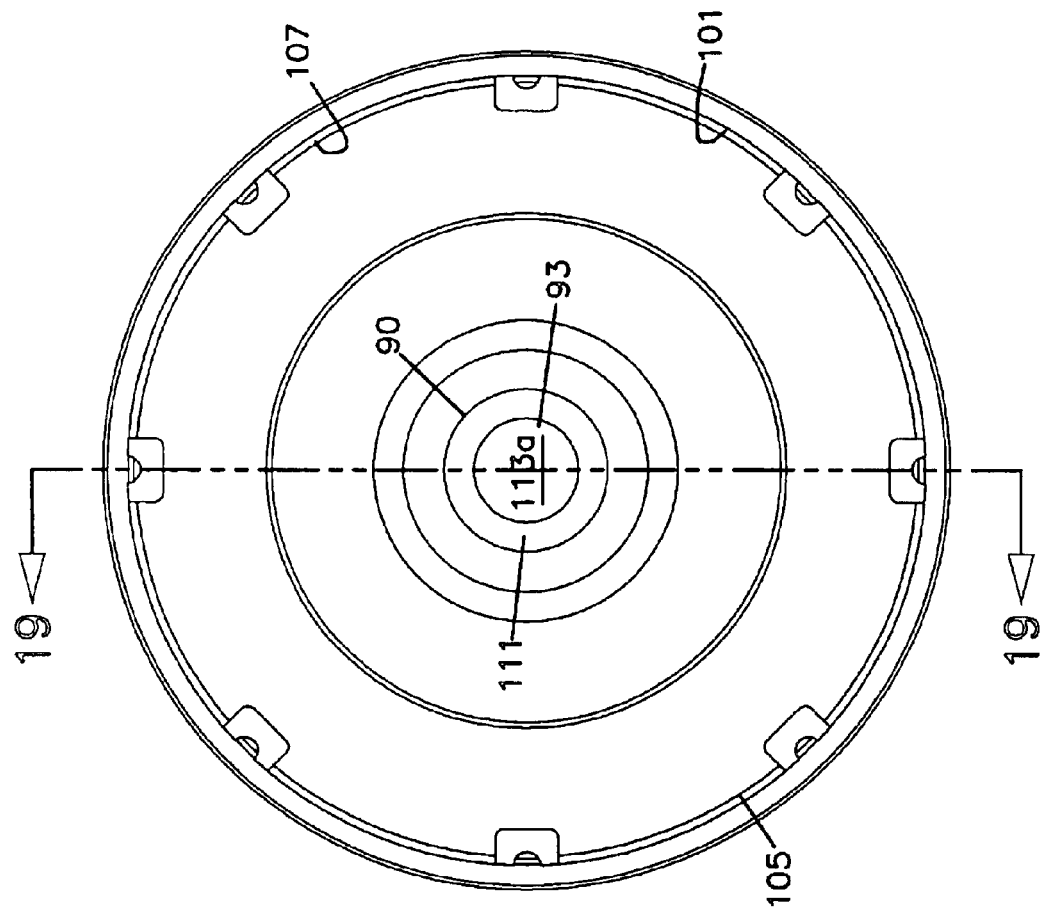
FIG. 18 is an end elevational view of the safety element depicted in FIG. 16.

Referring to FIGS. 12 and 13, the inner surface 66 includes an element engagement construction 70 thereon. The element engagement construction 70 is generally constructed and arranged to interlock or supportingly engage, abut or align with end 36 of element 25, when the cover 9 is positioned on an air cleaner 1 having the preferred primary element 25 installed. For the particular arrangement shown, the element engagement construction 70 comprises a projection 72, which projects into recess 74 of end cap 42, during installation. Preferably the projection 72 is sized and configured to supportingly abut, engage or align with central rim 55 during installation, during assembly. (It is noted that actual contact between projection 72 and rim 55 is not required, if the alignment is adequately close to ensure that the element 25 cannot move or rock downwardly undesirably far, typically, for example, no more than 20 millimeters.) It is noted that if only a few millimeter spacing or less is maintained, shortly after assembly, the main element will tend to settle until engagement actually occurs, typically either as a result of vibrational forces when the equipment is running, or added weight in the element due to particulate load with use.

For the particular preferred system depicted, central rim 55 is circular and thus defines circular recess 74. In preferred systems, the central region 53 is circumscribed by the media pack 43. Preferably, the central rim 55 includes an annular wall 57 with a projection segment 57a. Preferably, the projection segment 57a projects into the central open volume 50 from the second end 36 of the media pack 43 an axial distance of at least 6 mm, typically 12–25 mm, and no greater than 200 mm. The projection segment 57a may be angled or slant toward the interior 50, but by no more that a certain radial distance from the inner edge of the media pack 43 such that it would prevent fitting with the air cleaner end cover 9. Preferably, the projection segment 57a becomes radially spaced no further than 50 mm from the media pack 43 along a distance of inward axial projection of at least 6 mm. In the particular one depicted in the FIGS., segment 57a becomes radially spaced no further than 1–15 mm along a distance of inward axial projection of 12–25 mm. It should be noted that, in alternate embodiments, other portions of the annular wall 57 may be radially spaced from the media pack 43 longer than 50 mm.

Example dimensions include: the rim 55 having a diameter of at least 125 mm, typically 150–180 mm, and no greater than 300 mm. The recess 74 preferably has a depth (or height) (measured from rim 162 to planar region 158) of at least 6 mm, typically 12–25 mm, and no greater than 200 mm.

Preferably, an outer perimeter 75 of projection 72 is non-circular, for reasons that will be described below. Most preferably outer perimeter 75 includes at least three vertices or apices 79. Preferably, outer perimeter 75 defines a polyhedron which is sized and configured to engage, abut or become positionably aligned with circular central rim 55 at spaced points or vertices 76. Regular polyhedral shapes, i.e. polyhedrons having straight segments or sections 78 all of equal length, and defining spaced apices 79, are preferred. Most preferably, the polyhedral perimeter 75 has at least five sides and not more than ten sides, defining at least five and not more than ten apices. The particular projection 72 depicted in FIGS. 12 and 13 is octahedral.

Preferably, projection 72 is configured so that if it does not abut circular central rim 55, the apices 79 are spaced from the central rim 55, when the air cleaner 1 is assembled, by not more than 30 millimeters, and preferably not more than 15 millimeters. This will ensure that, when installed, the element 25 cannot rock downwardly undesirably far.

Preferably, the projection 72 will be continuous in extension, i.e. without gaps, so that it is fairly strong and not likely to break in use. However, discontinuous configurations can be used. Also, preferably, the projection 72 defines a hollow, recessed, interior 82 which, among other things, allows receiving room for certain additional features of the element 25 characterized below. Preferably, perimeter 75 comprises a continuous wall: (a) at least about 0.25 millimeters thick, typically 0.5 to 5 millimeters thick, no more than 20 mm thick; and (b) at least 10 millimeters high, typically 20 to 50 millimeters high, no more than 100 mm high.

Figure 9:
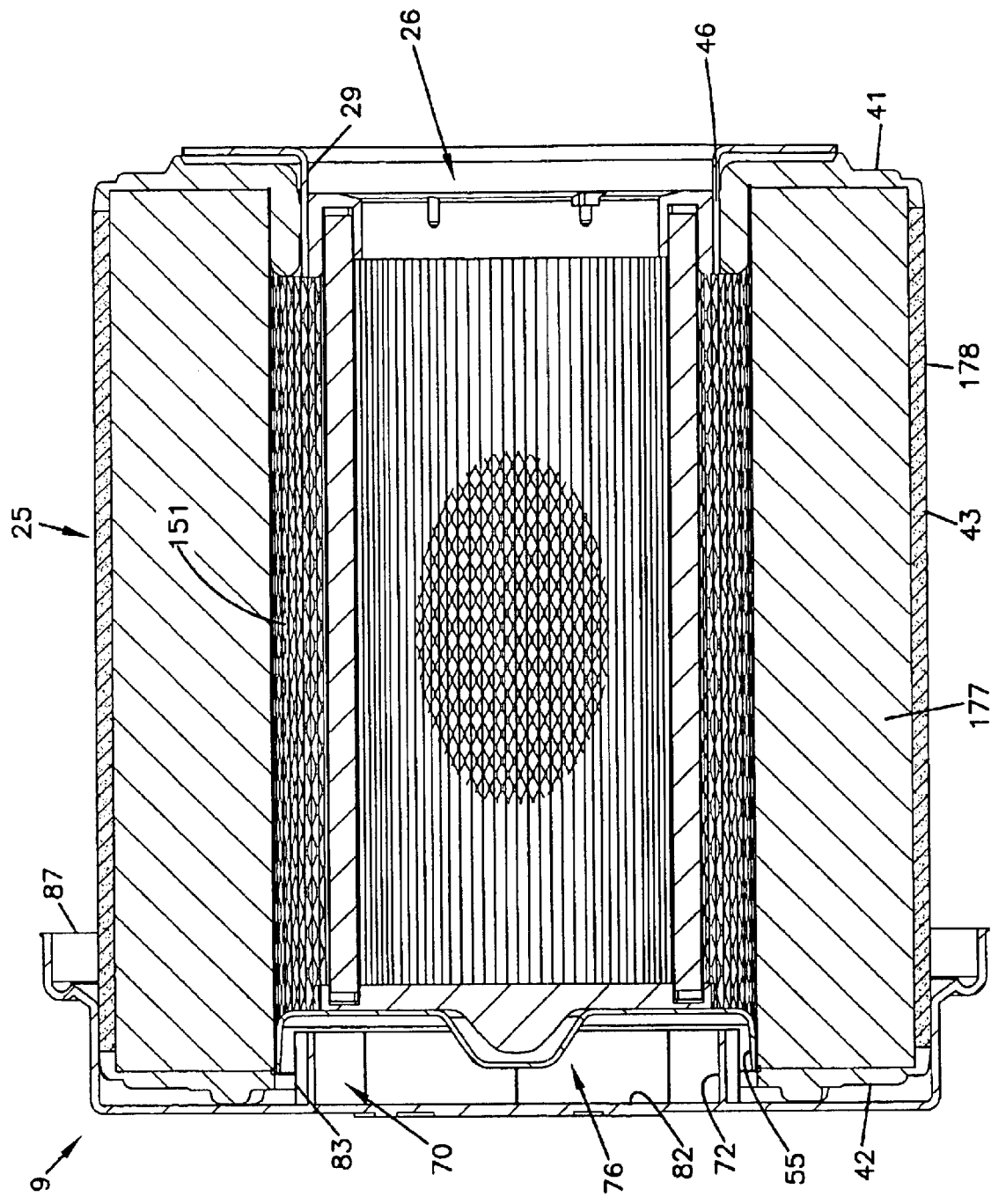
FIG. 9 is a cross-sectional view of the air cleaner showing the primary element and safety element operably mounted in the air cleaner housing.
Figure 10:
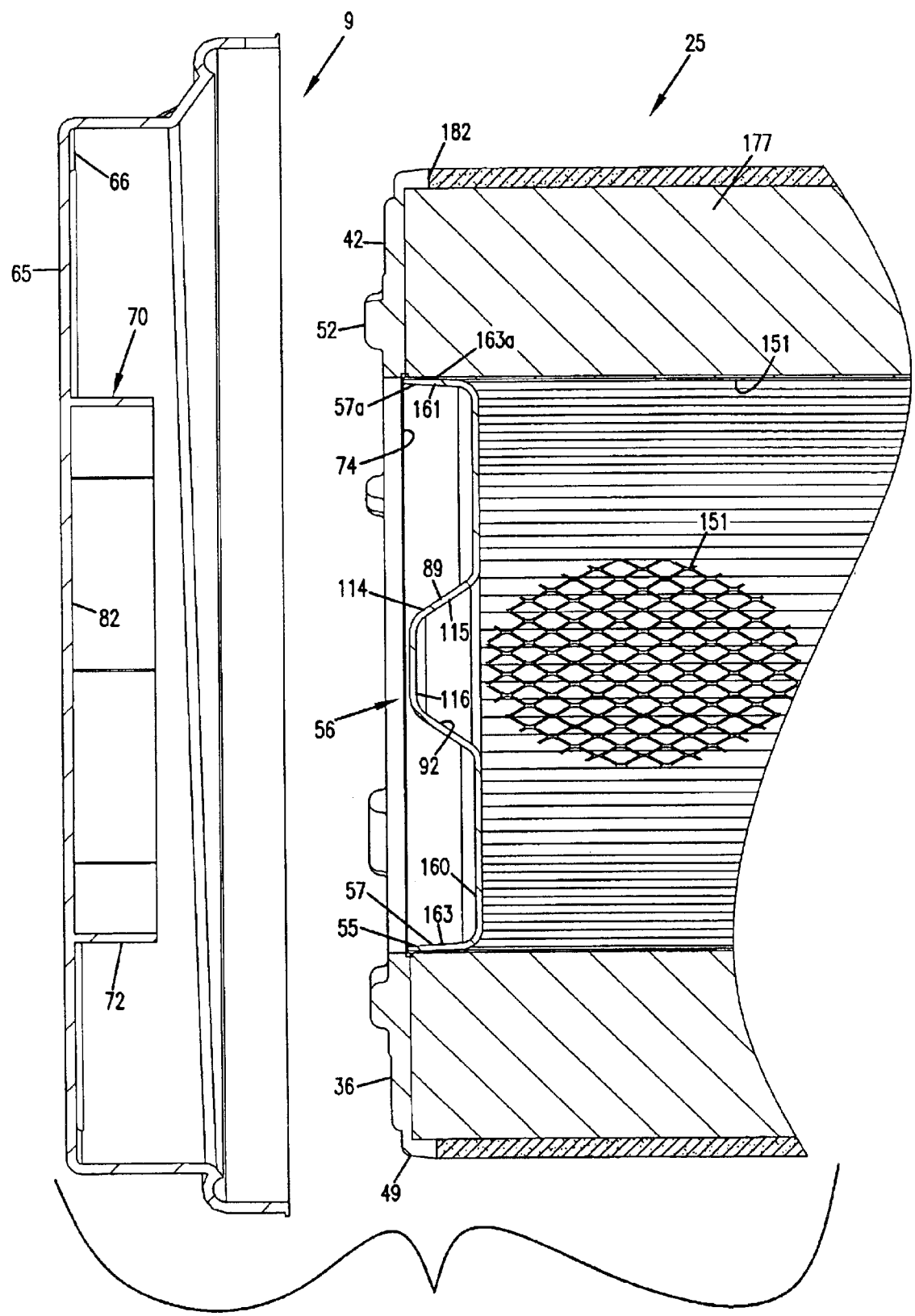
FIG. 10 is a fragmented, cross-sectional view depicting the housing cover being lined up with the end of the primary filter element.

By reference to FIGS. 9 and 10, it will be apparent that after the element is installed, once the cover 9 is put in place, projection 72 will extend into recess 74. In general, any upwardly directed apices, for example apex 83, FIG. 9, will support the element 25 and prevent the element 25 from undesirably sagging, rocking or dropping at end 36. For preferred arrangements, the parts are configured such that projection 72 extends at least 5 millimeters into recess 74, most preferably 10 to 30 millimeters, and not more than 100 mm. FIG. 9 also shows the safety element 26 installed in the system.

From an evaluation of FIGS. 9 and 10, certain advantages to particular configurations of annular region 49, and perimeter 75 will be apparent. Since the preferred annular area 49 is circular, the relative radial (rotational) position of the element 25 on ring 29 when installed, will make no difference, with respect to engagement by the end cover 9. That is, no matter how element 25 is radially oriented, it is generally radially symmetric with respect to axis 15, when installed, at least with respect to the configuration of rim 55.

If the housing were actually cylindrical instead of slightly obround, the preferred shape or configuration characterized with respect to the projection 72 and perimeter 75, would allow for variations in radial orientation of the end cover 9 on end 19. In particular, when the projection 72 contains at least five apices, equally spaced so, if the cover 9 were round, no matter how cover 9 was radially oriented on body 8, in closing the end 19, at least one apex would be directed generally upwardly. However, with the obround configuration, the cover 9 has a fixed configuration relative to the body 8, so the apices are oriented on the cover 9 to ensure that at least one is directed upwardly, when the construction is operably assembled.

It is preferred that the perimeter 75 not be round, for several reasons. First, if the perimeter 75 is not round, persons will be unlikely to try to seal an element to the perimeter 75, which can lead to an inappropriately assembled air cleaner 1. Also, a non-round structure will be relatively strong and self-supporting and will be fairly straight forward to manufacture to appropriate specification.

V. OTHER FEATURES OF END COVER 9

Attention is directed to FIGS. 11 and 14, with respect to end cover 9. External surface 65 generally includes flat central region 84. Surface 65 also includes stepped regions 85, with molded gussets 86 for support. As noted, the central region 84 is offset from concentric alignment with outer perimeter rim 87 (FIG. 14). This is so that the end cover 9 can match alignment in certain already existing air cleaner bodies.

As indicated above, certain other existing equipment uses a round housing, in which case the central axis for the projection 72 can be positioned in line with a central axis for the outer perimeter of the cover.

Attention is directed to FIGS. 12 and 13. Inner surface 66, central region 67 includes, projecting inwardly therefrom, wall 75 as well as radially extending strengthening ribs 68. Ribs 68 extend radially from the wall 75 to the outer perimeter rim 87.

VI. ARRANGEMENT FOR SAFETY ELEMENT ALIGNMENT

As indicated above, the preferred air cleaner 1 includes an arrangement 76 (FIGS. 20, 21) for ensuring appropriate alignment of the safety element 26 with the primary element 25.

The safety element alignment is one which does not require any structure on the seal ring 29, or indeed any additional structure on the housing 3, but rather operates with features on the elements 25, 26. Thus, it can be retrofit into previously existing housing bodies.

In general, the alignment arrangement 76 includes a projection/receiver arrangement 88 with a first member 89 of the projection/receiver arrangement 88 positioned on the primary element 25, and a second member 90 of the projection/receiver arrangement 88 provided on the safety element 26. For the particular arrangement shown, the primary element 25 includes a receiver member 92 in end cap 42, and the safety element 26 includes a projection member 93, on end cap 105.

Figure 19:
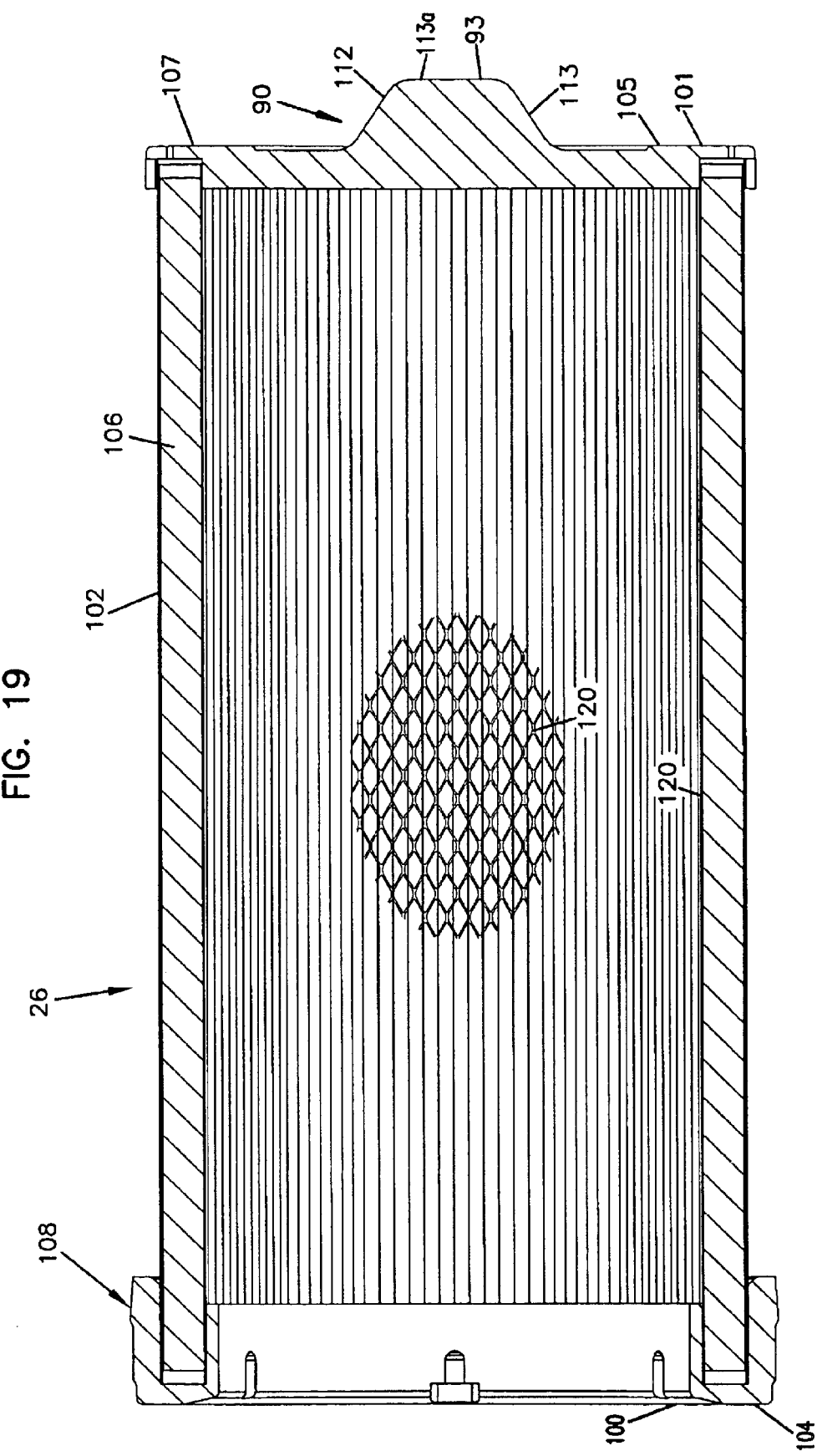
FIG. 19 is a cross-sectional view of the safety element depicted in FIGS. 16–18 and taken along the line 19—19 of FIG. 18.
Figure 20:
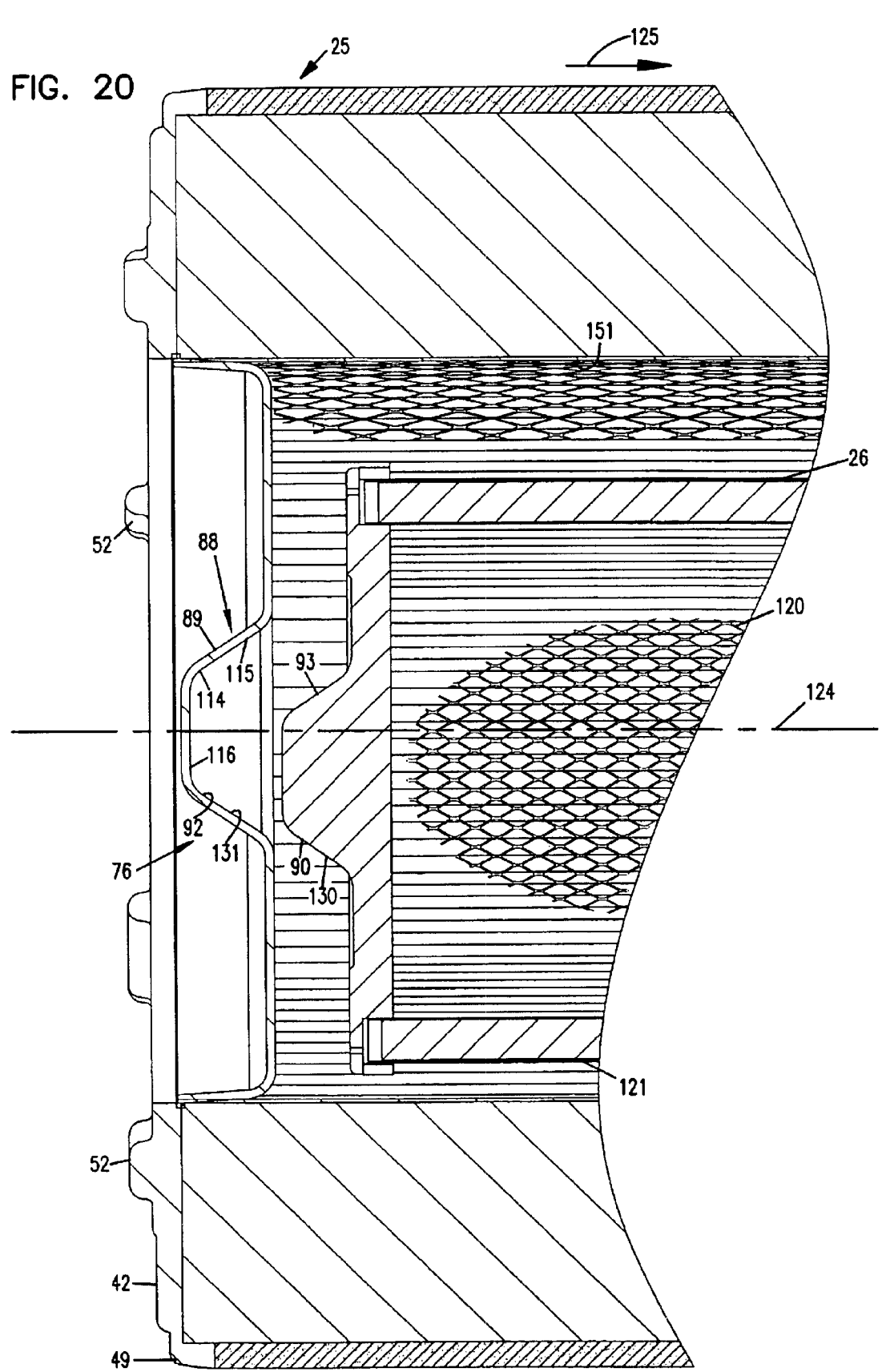
FIG. 20 is a fragmented, cross-sectional view depicting the primary element and safety element being aligned, during mounting of the primary element in the air cleaner.
Figure 21:
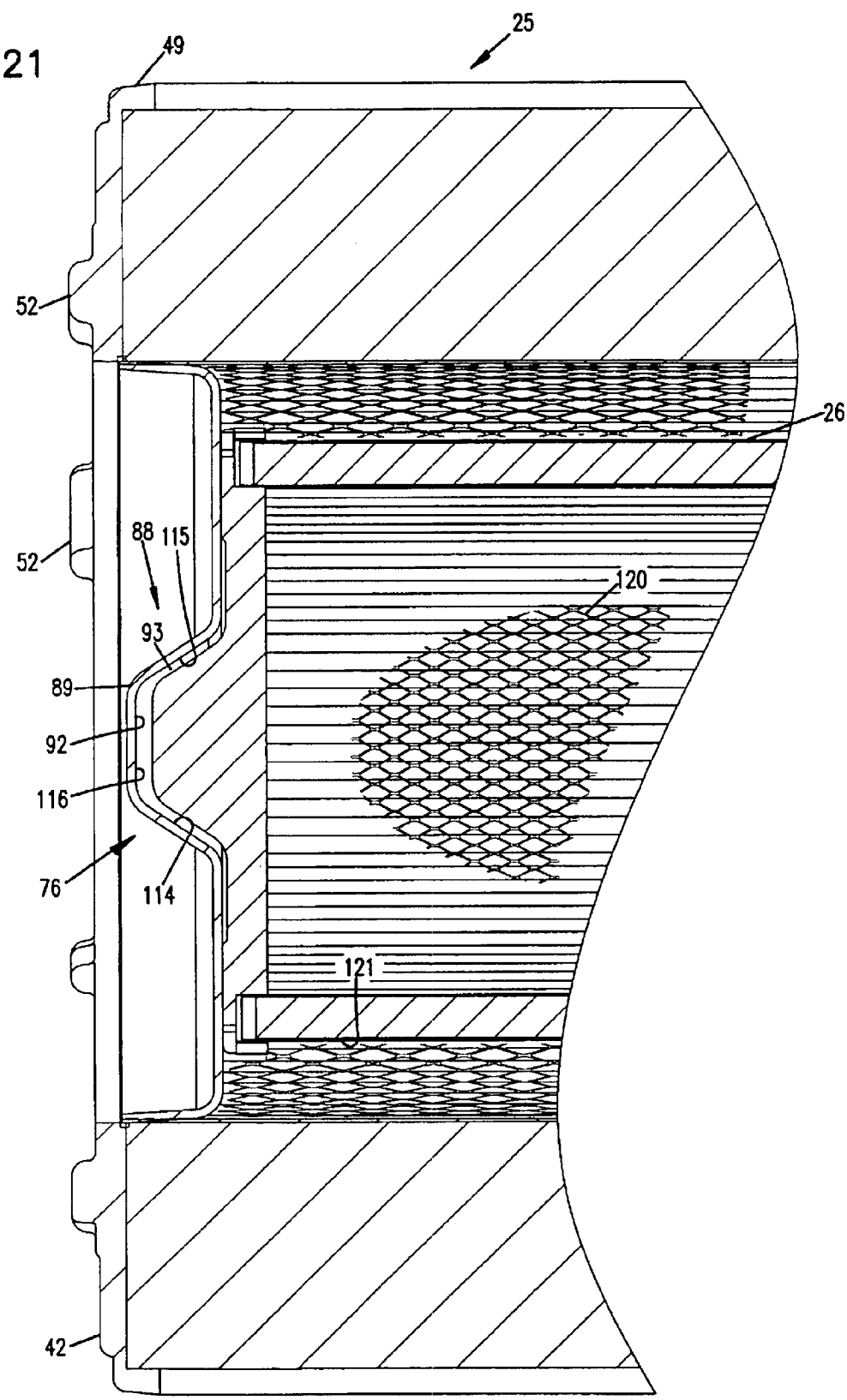
FIG. 21 is a fragmented, cross-sectional view showing the safety element and the primary element in proper alignment with each other.

Attention is directed to FIGS. 16–19, in which the safety element 26 is depicted. The safety element 26 includes a first open end 100, an opposite closed end 101, and a side extension 102. For the particular arrangement shown, the open end 100 is defined by a first open end cap 104; the closed end 101 is defined by a second closed end cap 105; and the side extension 102 is defined by a media pack 106 that is embedded in, and extends between, the two end caps 104, 105. The particular arrangement shown also includes an inner liner 120 and an outer liner 121, extending between the two end caps 104, 105. In alternate arrangements, the inner and outer liners 120, 121 may be omitted. In FIGS. 19–21, only a partial section of the inner liner 120 is depicted.

For the particular embodiment shown, the open end cap 104 provides the functions of: retaining the media pack sealed and assembled, at the open end 100; and, sealing seal region 108 (as an externally directed radial seal) to ring 29, when assembled. For preferred arrangements, end cap 104 is a unitary molded material comprising a soft compressible polymer, preferably foamed polyurethane. Preferred materials and material characteristics are described below.

The second end cap 105 also performs several functions. For example, it securely encloses end 101, and retains the media pack 106 sealed and assembled at that end. Also, the closed end cap 105 is oriented to extend adjacent to, and in some instances abuts, the primary element 25, so that the safety element 26 does not back away from end 110 (FIG. 1) of air cleaner 1, in use, once the primary element 25 has been installed.

For the preferred embodiment shown, another function provided by the safety element 26 is that it includes a portion of the projection/receiver arrangement 88, which engages a mating member on the primary element 25, to ensure appropriate axial alignment of the safety element 26, during assembly.

More specifically, the safety element 26 includes second member 90 of the projection receiver arrangement 88. For the particular arrangement shown, the second member 90 comprises projection member 93.

Preferred projection members are configured to have an outer perimeter 111 which includes some degree of radial symmetry, so that radial alignment of the safety element 26 is not critical to proper function of the projection/receiver arrangement 88. The particular preferred projection 93 depicted is a frustoconical member 112, having conical sidewall 113 and end 113a.

As described below, the preferred primary element 25 includes an appropriately sized and shaped receiver 92, for the frustoconical member 112.

More specifically, and referring to FIGS. 20–21, the primary element 25 includes a receiver member 92 constructed, arranged and oriented to receive frustoconical member 112 therein, during assembly. A preferred receiver member 92, for a frustoconical projection member 112, is a frustoconical receiver 114, comprising conical sidewall 115 and end 116.

Operation of the projection/receiver system 88, to facilitate alignment between the safety element 26 and the primary element 25 will be understood from the schematic depictions of FIGS. 20 and 21.

Referring to FIG. 20, the safety element is indicated at 26, and the main element at 25. The elements 25, 26 are shown with the safety element 26 out of perfect alignment with central axis 124. As a result of the misalignment, as the primary element 25 is moved in the direction of arrow 125, projection 93 of safety element 26 is engaged by receiver 92, again out of perfect axial alignment. However, a cam or sliding engagement between the surfaces 130 and 131, as primary element 25 continues to be moved in the direction of arrow 125, from the position shown in FIG. 20, will align the elements 25, 26. In particular, engagement between the surfaces 130 and 131 will force the safety element 26 to straighten out or reorient itself, into the alignment shown in FIG. 21. Alternately phrased, preferably the projection/receiver combination 92/93 is oriented such that when misalignment occurs, continued motion along the direction of a central axis for the primary element 25 will tend to cause the safety element 26 to slide into appropriate alignment. It is noted that engagement between the projection 93 and receiver 92, at the end of the alignment, FIG. 21, will also tend to retain the safety element in proper alignment, at least until the primary element 25 is removed.

It is preferred that the projection 93 and the receiver 92 each have sufficient circular symmetry (although not necessarily the same shape) so that relative radial orientation between the safety element and the primary element do not matter, for functioning of the projection/receiver assembly. The frustoconical configuration indicated is preferred but is not required. Alternative usable shapes include: cylinders, cubes, boxes, truncated spheres, hemispheres, and 3-d structures having cross-sections of triangles, pentagons, octagons, or other polyhedrons.

Preferred dimensions for the frustoconical projection 93 are provided herein: a height from end cap outer surface 107 to end 113a of at least 5 millimeters, typically 10–50 millimeters, and not greater than 100 mm; a base diameter, that is, the diameter at its largest section coplanar with end cap surface 107 of at least 25 millimeters, typically 30–80 millimeters, and not greater than 150 mm; and a diameter at its end 113a of at least 5 millimeters, typically 10–30 millimeters, not greater than 80 mm. The sidewall 113 extends at an angle between the base diameter and the end 113a at least 0.5°, typically 1–45°, and not greater than 80°. The receiver 92 is preferably sized to receive the projection 93 without interference. As such, the receiver 92 may be sized on the order of 5–20% larger than the above dimensions (i.e.: a height (or depth, depending on perspective) of 11–40 mm; a diameter at its largest section (open end) of 33–100 mm; and a diameter at its closed end of 11–40 mm).

VII. METHODS OF FORMING THE PRIMARY FILTER ELEMENT

In FIG. 7, media pack 43 is depicted. Media pack 43 includes an inner liner 151 and a cylindrical extension of filter media 152 that circumscribes the inner liner 151. For a preferred system, the inner liner 151 and extension media 152 are the same length. In FIG. 7, the inner liner 151 is shown fragmented. It should be understood that if an inner liner is used, the liner will line the entire inner portion of the filter media 152.

During typical assembly, the cylindrical extension of filter media 152 will be constructed and then be slid over inner liner 151. A later step of manufacture is an engagement between the media pack 43 and central end cap member 160. In a final molded construction, central end cap member 160 will serve to form and define the following features: central area 53 of the closed end cap 42; central rim 55; and, receiver 92.

Preferably, the central end cap member 160 has a bowl shape 161, with an outwardly projecting rim 162, central receiver 92, and planar region 158. In the particular embodiment depicted, planar region 158 corresponds to an outer surface portion of the end cap 42 that is most recessed relative to remaining portions of the end cap 42. Preferably, the recessed sidewall 163 of the bowl 161 has an outer circular periphery 163a (FIG. 10) with an outside diameter slightly larger than an inside diameter of inner liner 151, so as to cause an interference fit when the inner liner 151 is pressed over sidewall 163.

The assembly comprising central end cap member 160 and media pack 43 is then positioned in a mold, into which is also positioned a resin for forming a remainder of the closed end cap 42.

The opposite open end cap 41 can be formed either before or after the closed end cap 42. In general, the open end cap 41 would be formed by placing an appropriate end of the media pack 43 into a mold, with resin to form the end cap. Preferred central end cap member 160 will comprise molded, rigid plastic, constructions.

VIII. PREFERRED METHODS OF FORMING THE SAFETY FILTER ELEMENT

The safety filter element 26 can generally be manufactured in accord with previously applied manufacturing techniques, except for modifications to manage the configuration of the member of the projection/receiver arrangement 88 position on the closed end 101 of the safety element 26. Preferably the closed end 101 of the safety element 26 is formed from a molded plastic, such as urethane having a hardness of 30 Shore D.

Typical methods of preparation, then, would involve assembling the media pack; placing a first end in a mold, with resin, to mold the closed end cap; and placing a second end in a mold, with resin, to form the open end cap.

As to the open end cap having the external directed radial seal thereon, resin capable of forming upon cure, and appropriately soft, compressible polyurethane end cap of the same type as would be used to form the first end cap having the radial seal thereon for the primary element, would generally be preferred. A preferred such material is characterized below.

IX. PREFERRED MEDIA PACKS

The preferred media pack for the primary and safety element will, in part, depend upon specifications and efficiency needs for the engine or other system involved. Herein, a preferred primary element media pack will be described, which was developed specifically to lead to enhanced performance for certain types of off road construction equipment, farm equipment, and mining equipment, as characterized.

In particular, the following equipment has utilized the Donaldson Radialseal™ system for a number of years: Caterpillar tractors, waste handling arrangements, truck loaders, skid steer loaders, pipelayers, excavators, material handlers, front shovels, forest machines, track skidders, compactors, pavers, soil stabilizers, planers, combines, VFS trailers, backhoe loaders, off highway trucks, off highway tractors, skidders, scrapers, and motor graders.

The system installed, however, in that equipment, generally: (1) has not had an alignment system to support or bias the safety element into appropriate alignment, as engagement with the primary element occurs; and (2) has been limited in lifetime due to restriction buildup as dust is loaded on the system.

In developing the preferred elements characterized herein, Donaldson made efforts to expand substantially the duration of operation lifetime for elements in such equipment without modifying the size and configuration of the air cleaner body; and, without seeking modification of the engine specifications or operation.

A new element construction, for longer performance, is now presented. In general terms, the media construction comprises two media segments: an inside pleated media section; and, an outer region of non-woven fibrous depth media.

One particular useful construction is depicted in FIG. 7. In this construction, the primary element has first open end cap 41, comprising soft compressible foam polyurethane in accord with the specifications given below; second end cap 42 manufactured in accord with the method indicated above and comprising a composite of: a central bowl 161 molded from rigid plastic; and an outer annular region molded from urethane. The media pack comprises inner liner 151 which is porous; immediately surrounded by a pleated media region 177 having a pleat depth of at least 25 mm, typically 50–100 mm. Preferably the pleated media 177 comprises paper or cellulose. One type of pleated cellulose usable in constructions described herein has the following properties: a basis weight of 63–71 lbs./3000 ft$^2$; a thickness of about 0.013 inch; a pore size of about 88 microns; a corrugation of 0.015–0.021 inch; a dry tensile strength of 12–28 lbs./in.; a wet tensile strength of 3–13 lbs./in.; a wet burst strength of 15–35 psi; a Frazier permeability of 50–64 ft./min. Preferably, the inner liner comprises expanded metal, but may also be non-metallic such as plastic.

Positioned outside of the pleated media is a cylindrical extension of fibrous depth media 178, preferably an air laid polyester fiber media having thickness within the construction of 0.25–1 inch. In particular media having the following properties is usable: a weight of 4.6–5.6 oz./yd.$^2$; and a permeability of 900 ft./min.

In the particular arrangement shown, the extension of depth media comprises a single wrap of material such as fibrous depth media, stitched to form seam 180. Alternative methods of securing the commercially available depth media 178 in a cylindrical configuration can be used.

It is noted that a variety of alternate constructions of depth media can be provided, for example, multilayered systems, gradient systems, etc. However, the particular construction shown, with specifications as indicated below, leaves a substantial improvement when installed in a previously existing air cleaner. In some arrangements, it may be desirable to secure or support the pleated media 177 with a narrow band around the circumference of the pleat tips. If a band is used, the band will be applied before the outer wrap 178 is placed over the pleated media 177.

Attention is again directed to FIG. 7. FIG. 7 shows the entire media pack 43 as embedded or molded in each of the end caps 41, 42. It can be seen that the sleeve of depth media 178 is tucked into the end cap 41 at tuck 181. Similarly, the opposite end of the sleeve of fibrous depth media 178 is tucked into end cap 42 at tuck 182. In the arrangement shown in FIG. 7, it is contemplated that the entire media pack 43 including both the pleated media 177 and the depth media 178 is embedded in each of the end caps 41, 42 as a total unit, which results in the tucked regions 181, 182. In alternative methods of constructions, only the pleated media 177 will be molded within and embedded in the opposite end caps 41, 42. In this alternative arrangement, the depth media 178 is then wrapped around the resulting construction of the pleated media 177 embedded in the opposite end caps 41, 42.

Preferably, the end cap 41 and the end cap 104, which form the sealing regions 46, 108 respectively, are constructed of molded foamed polyurethane. One example material has the following properties: a tensile strength of 110 psi minimum; an elongation of 200% minimum; a tear strength of 15 lbs./in. minimum; a compression deflection at 70° F. of an average of 7–14 psi; a compression deflection after heat aging 7 days at 158° F. of +/−20% change from original deflection values; a compression deflection at cold temperature of −40° F. of 100 psi maximum; a compression set after heat aging 22 hours at 158° F. of 10% maximum; and after heat aging 22 hours at 180° of 25% maximum.

X. EXAMPLES

One example primary element has the following dimensions: an overall length of at least 225 mm, typically 300–385 mm; an inner diameter at its open end cap of at least 125 mm, typically 150–255 mm; an inside diameter of the bowl 161 of at least 125 mm, typically 150–180 mm; a height of the receiver member 92 of at least 6 mm, typically 12–25 mm; an outermost diameter of the receiver 92 of at least 25 mm, typically 37–75 mm; an overall outer diameter of at least 200 mm, typically 280–385 mm.

One example safety element 26 has the following dimensions: an overall length of at least 125 mm, typically 255–385 mm; an outermost diameter of at least 75 mm, typically 125–200 mm; an inside diameter of at least 50 mm, typically 75–125 mm; and a height of projection member 93 of at least 6 mm, typically 12–20 mm.

One example end cover 9 has the following dimensions: an outermost diameter of at least 150 mm, typically 300–400 millimeters; a depth of at least 20 mm, typically 40–100 millimeters; a polyhedral wall forming the outer perimeter 75 having a height of 20–60%, typically 30–50% of the overall height of the end cover, at least 5 mm, typically 10–40 millimeters.

What is claimed is:

1. A method of servicing an air cleaner; the method comprising steps of:
   (a) removing a removable service cover from an air cleaner housing to expose an open end and a first serviceable filter element;
      (i) the first serviceable filter element comprising:
         (A) an extension of media having first and second ends, surrounding an open filter interior, extending between first and second end caps;
            (1) the first end cap having a central air flow aperture therein in fluid flow communication with the open filter interior;
            (2) the second end cap being a closed end cap having no aperture therethough and comprising:
               (I) a closed recess projecting into the open filter interior from the second end of the media;
      (ii) the first serviceable filter being positioned with the closed end cap directed toward the open end provided by the step of removing the removable service cover;
   (b) removing the first serviceable filter element from the air cleaner housing by drawing the serviceable filter element outwardly from the housing, by passage through the open end provided by the step of removing the service cover;
   (c) positioning a second serviceable filter element within the air cleaner housing, by passage through the open end;
      (i) the second serviceable filter element comprising:
         (A) an extension of media having first and second ends, surrounding an open filter interior, extending between first and second end caps;
            (1) the first end cap having a central air flow aperture therein in fluid flow communication with the open filter interior;
            (2) the second end cap being a closed end cap having no aperture therethough and comprising:
               (I) a closed recess projecting into the open filter interior from the second end of the media;
      (ii) the step of positioning including positioning the second serviceable filter element within the housing with the closed end cap directed toward the open end; and
   (d) mounting the service cover with:
      (i) a non-circular projection on the service cover projecting into the closed recess in the second end cap of the second serviceable filter element.

2. A method of servicing according to claim 1 wherein:
   (a) the step of removing the first serviceable filter element includes removing the first serviceable filter element from a position mounted over a first safety filter element; and
   (b) the step of positioning a second serviceable filter element comprises a step of positioning the second serviceable filter element over the first safety element.

3. A method of servicing according to claim 2 wherein:
   (a) the step of positioning a second serviceable filter element comprises positioning a second serviceable filter element with a frustoconical section in the second end cap directed toward the open end;
      (i) the step of positioning including arranging the second serviceable filter element to receive a portion of the first safety element projecting into the frustoconical section.

4. A method of servicing according to claim 1 wherein:
   (a) the step of positioning a second serviceable filter element comprises positioning a second serviceable filter element having a frustoconical section on the second end cap directed toward the open end; and
   (b) the step of mounting the service cover includes positioning a recess in the non-circular projection over and around the frustoconical section of the second serviceable filter element.

5. A method of servicing according to claim 4 wherein:
   (a) the step of mounting the service cover comprises mounting the service cover with a non-circular projection having at least three vertices projecting into the closed recess of the second end cap.

6. A method of servicing according to claim 1 wherein:
   (a) the step of mounting the service cover comprises mounting the service cover with a non-circular projection having at least three vertices projecting into the closed recess of the second end cap.

7. A method of servicing according to claim 1 wherein:
   (a) the step of positioning a second serviceable filter element includes the second serviceable filter element having a cylindrical extension of media.

8. A method of servicing according to claim 1 wherein:
   (a) the step of positioning a second serviceable filter element includes the second serviceable filter element having a first end cap with an internally directed radial seal region.

9. A method of servicing according to claim 1 wherein:
   (a) the step of positioning a second serviceable filter element includes the second serviceable filter element having an inner liner.

10. A method of servicing according to claim 1 further comprising:
    (a) after the step of mounting the service cover, securing the service cover to the air cleaner housing with latches.

11. A method of servicing according to claim 1 wherein:
    (a) the step of mounting the service cover includes radially aligning the service cover and the air cleaner housing by engagement between a notch on one of the service cover and air cleaner housing and post on the other of the service cover and air cleaner housing.

12. A method of servicing according to claim 1 wherein:
    (a) the step of positioning a second serviceable filter element includes the second serviceable filter element having a second end cap comprising a composite structure including:
(i) a pre-form defining the closed recess; and
(ii) an annular, molded, ring portion to which the media pack and the pre-form are secured.

13. A method of servicing an air cleaner; the method comprising:
(a) removing a filter element from an air cleaner housing; the housing including a body and a removable cover; the cover having an inner side including a central projection thereon;
(b) orienting a new filter element into the air cleaner housing body; the new filter element having a media pack, and first and second, opposite, end caps;
(i) the first end cap having a central aperture;
(ii) the second end cap being a closed end cap having no aperture therethough and comprising a composite structure including:
(A) a pre-form defining a recess;
(B) an annular, molded, ring portion to which the media pack and the pre-form are secured; and
(c) orienting the removable cover over an open end of the housing body by extending the central projection on the cover into the recess of the pre-form.

14. A method according to claim 13 wherein:
(a) the step of removing a filter element includes removing the filter element from a position mounted over a safety filter element; and
(b) the step of positioning a new filter element comprises a step of positioning the second filter element over the first safety element.

15. A method according to claim 13 wherein:
(a) the step of orienting a new filter element includes orienting the new filter element wherein the second end cap comprises a composite structure including the pre-form with the recess and the annular, molded, ring portion to which the media pack and the pre-form are secured;
(i) the pre-from having a circular wall surrounded by the media pack; and a recessed central base;
(ii) the annular, molded, ring portion defining a portion of an outer end surface of the second end cap; and
(iii) the second end cap resulting from: positioning the media pack around the circular wall of the pre-form; and then potting the resulting combination of pre-form and media pack into moldable polymer such that a portion of the moldable polymer, upon molding, defines a portion of an outer surface of the second end cap.

16. A method according to claim 13 wherein:
(a) the step of orienting the removable cover over an open end of the housing body by extending the central projection on the cover into the recess of the pre-form includes orienting a cover having a non-circular projection with at least three vertices projecting into the recessed central base of the pre-form in the second end cap.

17. A method according to claim 13 wherein:
(a) the step of orienting a new filter element into the air cleaner housing body includes forming a radial seal between the first end cap and the air cleaner housing body.

18. A method according to claim 13 further comprising:
(a) after the step of removing a filter element, removing a safety filter element from the air cleaner housing; and then
(b) installing a new safety filter element in the air cleaner housing.

19. A method of installing a filter element into an air cleaner; the method comprising:
(a) providing a filter element having a media pack defining an open volume, a first open end cap, and an opposite second end cap;
(i) the second end cap being a closed end cap with no aperture therethrough and including a closed recess projecting into the open volume; and
(b) orienting an access cover having an inner side with a non-circular central projection thereon over the filter element by extending the central projection into the closed recess to support the filter element.

20. A method of servicing an air cleaner; the method comprising:
(a) removing a filter element from an air cleaner housing; the housing including a body and a removable cover; the cover having an inner side including a central projection thereon;
(i) the central projection including a non-circular projection with at least three vertices;
(b) orienting a new filter element into the air cleaner housing body; the new filter element having a media pack, and first and second, opposite, end caps;
(i) the first end cap having a central aperture;
(ii) the second end cap comprising a composite structure including:
(A) a pre-form defining a recess;
(B) an annular, molded, ring portion to which the media pack and the pre-form are secured; and
(c) orienting the removable cover over an open end of the housing body by extending the non-circular projection with at least three vertices on the cover into the recess of the pre-form.

21. A method according to claim 20 wherein:
(a) the step of removing a filter element includes removing the filter element from a position mounted over a safety filter element; and
(b) the step of positioning a new filter element comprises a step of positioning the second filter element over the first safety element.

22. A method according to claim 20 wherein:
(a) the step of orienting a new filter element into the air cleaner housing body includes forming a radial seal between the first end cap and the air cleaner housing body.

23. A method according to claim 22 wherein:
(a) the step of orienting a new filter element includes orienting the new filter element wherein the second end cap comprises a composite structure including the pre-form with the recess and the annular, molded, ring portion to which the media pack and the pre-form are secured;
(i) the pre-from having a circular wall surrounded by the media pack; and a recessed central base;
(ii) the annular, molded, ring portion defining a portion of an outer end surface of the second end cap; and
(iii) the second end cap resulting from: positioning the media pack around the circular wall of the pre-form; and then potting the resulting combination of pre-form and media pack into moldable polymer such that a portion of the moldable polymer, upon molding, defines a portion of an outer surface of the second end cap.

* * * * *

UNITED STATES PATENT AND TRADEMARK OFFICE
CERTIFICATE OF CORRECTION

PATENT NO. : 6,837,920 B2
DATED : January 4, 2005
INVENTOR(S) : Gieseke et al.

It is certified that error appears in the above-identified patent and that said Letters Patent is hereby corrected as shown below:

Title page,
Item [57], ABSTRACT,
Line 1, delete "is";

Coulmn 15,
Lines 37 and 61, delete "therethough" and insert -- therethrough --;

Column 17,
Line 17, delete "therethough" and insert -- therethrough --;
Line 39, delete "pre-from" and insert -- pre-form --;

Column 18,
Line 55, delete "pre-from" and insert -- pre-form --.

Signed and Sealed this

Thirty-first Day of May, 2005

JON W. DUDAS
*Director of the United States Patent and Trademark Office*